US012802672B2

(12) United States Patent
Takata et al.

(10) Patent No.: US 12,802,672 B2
(45) Date of Patent: Nov. 17, 2026

(54) KEYBOARD DEVICE AND METHOD FOR GUIDING KEY

(71) Applicant: Roland Corporation, Shizuoka (JP)

(72) Inventors: Yukihide Takata, Shizuoka (JP); Mutsuo Sawada, Shizuoka (JP); Shiro Uno, Shizuoka (JP)

(73) Assignee: Roland Corporation, Shizuoka (JP)

( * ) Notice: Subject to any disclaimer, the term of this patent is extended or adjusted under 35 U.S.C. 154(b) by 367 days.

(21) Appl. No.: 18/746,041

(22) Filed: Jun. 18, 2024

(65) Prior Publication Data

US 2024/0428765 A1 Dec. 26, 2024

(30) Foreign Application Priority Data

Jun. 21, 2023 (JP) ................................ 2023-101924

(51) Int. Cl.
*G10H 1/34* (2006.01)

(52) U.S. Cl.
CPC ....... *G10H 1/346* (2013.01); *G10H 2220/265* (2013.01)

(58) Field of Classification Search
CPC ............. G10H 1/346; G10H 2220/265; G10H 2220/221; H01H 13/7065; H01H 13/85
See application file for complete search history.

(56) References Cited

U.S. PATENT DOCUMENTS

2016/0012809 A1 1/2016 Takata et al.
2022/0310050 A1 9/2022 Yamaguchi
2023/0306932 A1 9/2023 Ichikawa et al.
2024/0071345 A1 * 2/2024 Hisamitsu .............. G10H 1/346

FOREIGN PATENT DOCUMENTS

JP 2015034853 2/2015
JP 2019060402 4/2019
JP 2022152006 10/2022

* cited by examiner

*Primary Examiner* — Kimberly R Lockett
(74) *Attorney, Agent, or Firm* — JCIPRNET

(57) ABSTRACT

Since an entire guided surface (from an upper end of an inclined surface to a lower end of a curved surface) faces a guide surface in a scale direction at an initial position before key pressing, even if grease is scraped upward due to swinging of a white, the grease is likely to stay in sliding regions on the guided surfaces. In addition, since a spacing between the guide and guided surfaces gradually widens from the upper end sides to the lower ends of the guided surfaces, even if the guided surfaces slides downward with respect to the guide surface when the white key is pressed, the grease applied to each of the surfaces is unlikely to be scraped off downward. This also makes it easier to retain the grease in the sliding regions on the guided surfaces. Thus, a feeling of pressing the white key can be improved.

19 Claims, 13 Drawing Sheets

KEYBOARD DEVICE AND METHOD FOR GUIDING KEY

CROSS-REFERENCE TO RELATED APPLICATION

This application claims the priority benefit of Japan application serial no. 2023-101924, filed on Jun. 21, 2023. The entirety of the above-mentioned patent application is hereby incorporated by reference herein and made a part of this specification.

BACKGROUND

Technical Field

The disclosure relates to a keyboard device and a method for guiding a key and particularly relates to a keyboard device and a method for guiding a key in which a feeling of key pressing can be improved.

Description of Related Art

Regarding a keyboard device in which rear portions of keys are swingably supported by a support member, a technology in which swinging of a key is guided using a guide provided on a side behind a support position (which will hereinafter be referred to as "a swinging fulcrum") of the key by a support member is known. For example, Patent Document 1 describes a technology in which a plurality of partition walls 13*a* facing each other with a rear end portion of each of keys 2 sandwiched therebetween are formed in a chassis rear portion 13 and the rear end portion of the key 2 is sandwiched between a pair of key guiding projecting portions 13*b* protruding from a partition wall 13*a*. According to this technology, swinging of the rear end portion of the key 2 can be guided by the key guiding projecting portions 13*b* positioned on a side behind the swinging fulcrum of the key 2.

PATENT DOCUMENTS

[Patent Document 1] Japanese Patent Laid-Open No. 2022-152006 (for example, Paragraph 0034, FIG. 2)

However, in the technology in the related art described above, grease applied to a sliding part between the key 2 and the key guiding projecting portions 13*b* is scraped out vertically due to swinging of the key 2 so that swinging of the key 2 may not be able to be smoothly guided. Thus, there is a problem that a feeling of key pressing is likely to be degraded.

The disclosure provides a keyboard device and a method for guiding a key in which a feeling of key pressing can be improved.

SUMMARY

A keyboard device according to the disclosure includes a support member, keys of which rear portions are swingably supported by the support member, and guides which guide swinging of the keys on a side behind support positions of the rear portions of the keys, in which the guides each include a pair of guide surfaces directed in a scale direction, the keys each include a pair of guided surfaces facing the pair of guide surfaces in the scale direction, the entire guided surfaces face the guide surfaces at an initial position before the key is pressed, gaps are respectively formed with respect to the guide surfaces on lower end sides of the guided surfaces, and the gap gradually widens toward the lower end sides of the guided surfaces.

A method for guiding a key according to the disclosure is a method for guiding the key in a keyboard device including a support member, keys of which rear portions are swingably supported by the support member, and guides which guide swinging of the keys on a side behind support positions of the rear portions of the keys, in which the guides each include a pair of guide surfaces directed in a scale direction, and the keys each include a pair of guided surfaces facing the pair of guide surfaces in the scale direction. The method includes causing the entire guided surfaces to face the guide surfaces at an initial position before the key is pressed, respectively forming gaps with respect to the guide surfaces on lower end sides of the guided surfaces, and forming the gap to gradually widen toward the lower end sides of the guided surfaces.

DESCRIPTION OF THE EMBODIMENT

Figure 1:
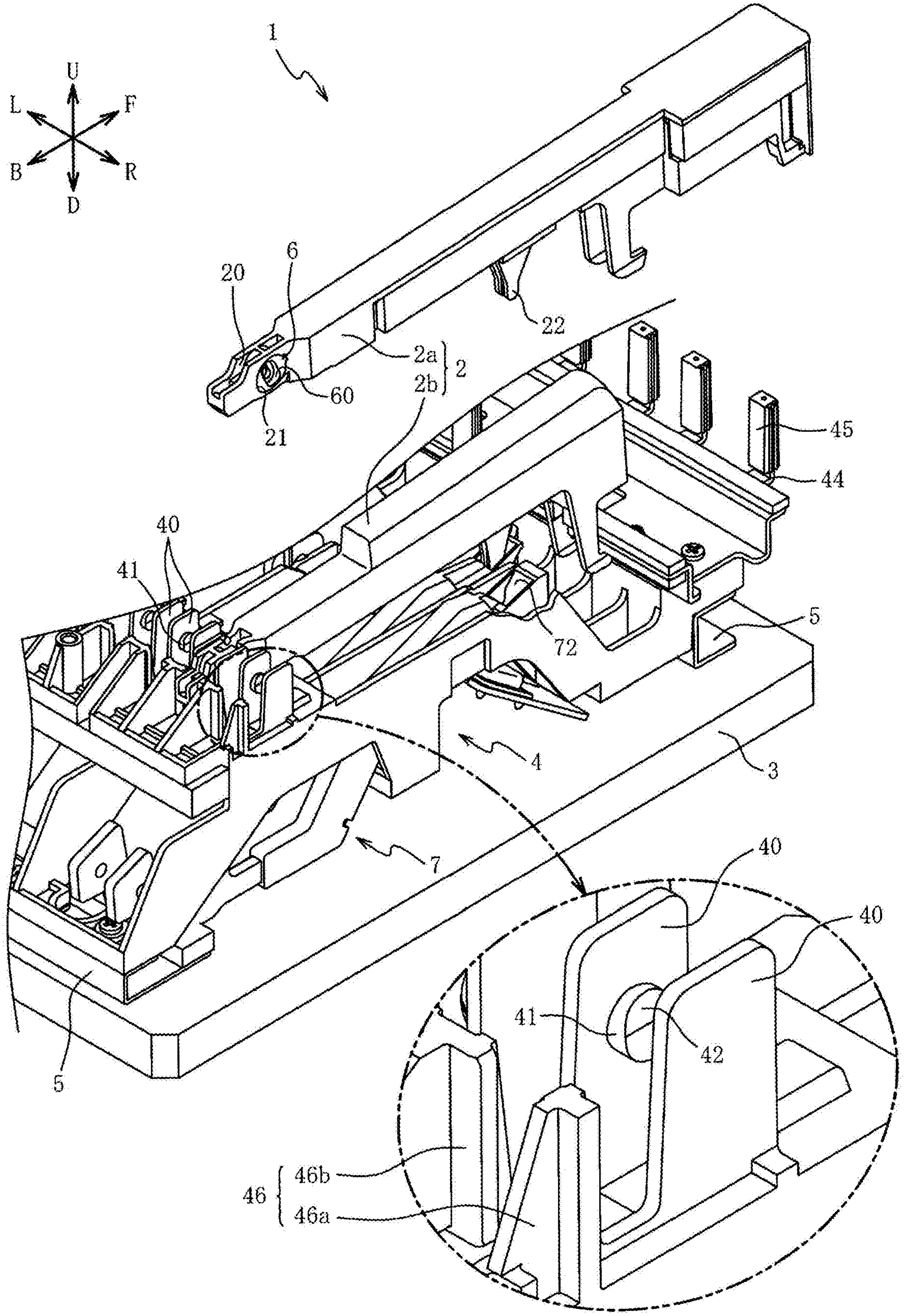
FIG. 1 is a perspective view of a keyboard device according to an embodiment.

Hereinafter, a preferred embodiment will be described with reference to the accompanying drawings. First, with reference to FIGS. 1 and 2, an overall constitution of a keyboard device 1 will be described. FIG. 1 is a perspective view of the keyboard device 1 according to an embodiment, and FIG. 2 is a cross-sectional view of the keyboard device 1.

Figure 2:
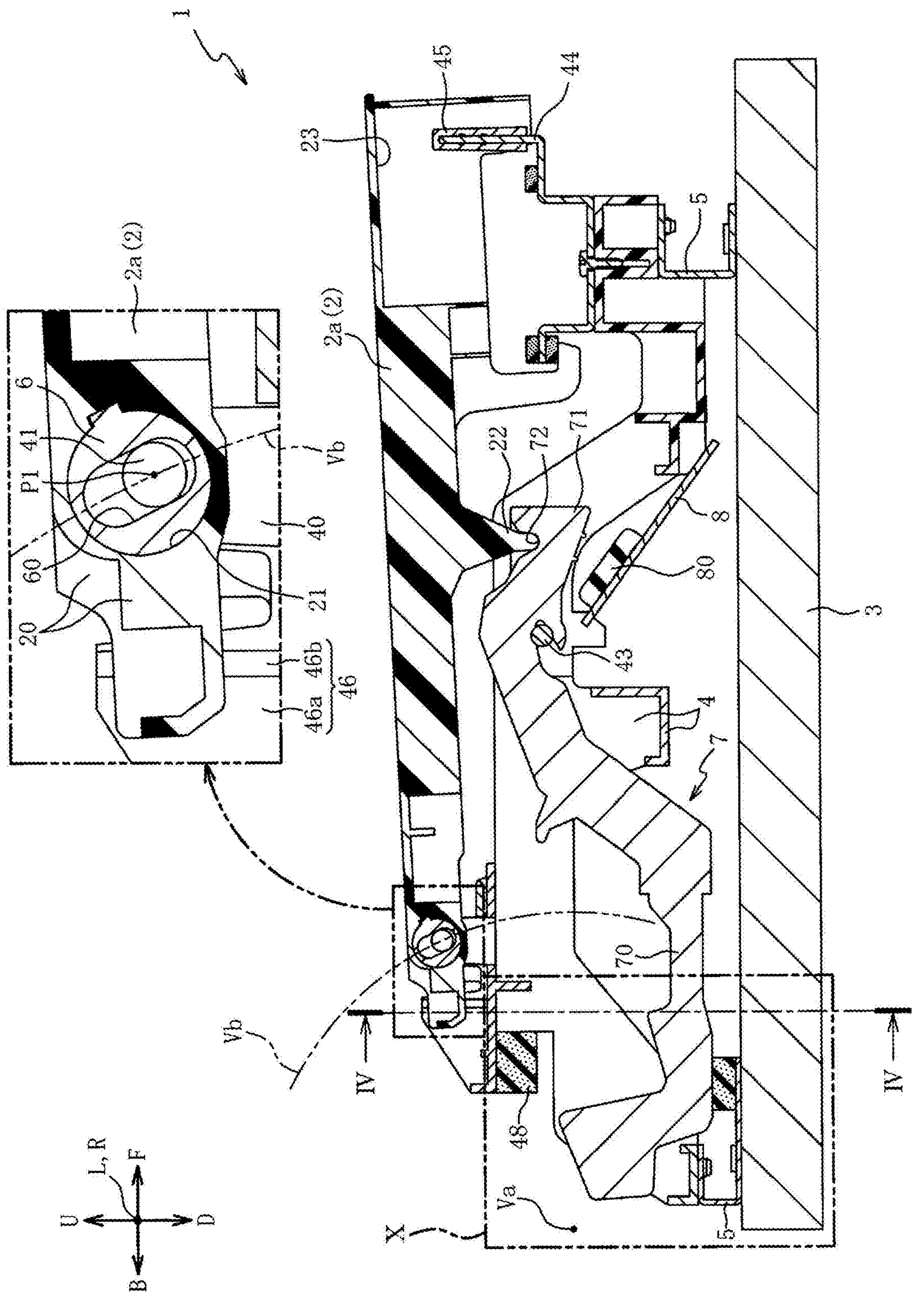
FIG. 2 is a cross-sectional view of the keyboard device.

FIG. 1 illustrates a state in which a part of a chassis 4 is cut away and a reception portion 72 of a hammer 7 is exposed, and FIG. 2 illustrates a cross section cut along a flat surface orthogonal to a scale direction (a direction in which a plurality of keys 2 are arranged). In addition, in FIG. 2, in order to facilitate understanding, hatching of shaft portions 41 is omitted. The arrow U-D direction, the F-B direction, and the L-R direction in FIGS. 1 and 2 respectively indicate an upward-downward direction, a forward-rearward direction, and the scale direction of the keyboard device 1, and the same also applies to FIG. 3 and thereafter.

As shown in FIGS. 1 and 2, the keyboard device 1 is a keyboard instrument (electronic piano) including a plurality of (in the present embodiment, 88) keys 2. The keys 2 include a plurality of (in the present embodiment, 52) white keys 2*a* for playing natural tones and a plurality of (in the present embodiment, 36) black keys 2*b* for playing derived tones, and the plurality of white keys 2*a* and the plurality of black keys 2*b* are arranged in the scale direction (arrow L-R direction).

The keyboard device 1 includes a shelf board 3 for supporting the white keys 2*a* and the black keys 2*b*. The shelf board 3 is formed to have a flat plate shape using a synthetic resin, a steel plate, or the like extending in the scale direction, and the resin chassis 4 is supported on an upper surface of this shelf board 3. In the chassis 4, both front and rear end portions thereof (arrow F-B direction) are fixed to the shelf board 3 with a channel material 5 therebetween. Hereinafter, a support structure for the white keys 2*a* with respect to the chassis 4 and a detailed constitution of the white key 2*a* will be described. However, the constitution is practically the same in the black key 2*b* as well.

Wall portions 40 rise upward from an upper surface of the chassis 4 on a rear end side (arrow B side), and the substantially columnar shaft portions 41 protrude in the scale direction from side surfaces of the wall portions 40 on an upper end side (refer to the enlarged part in FIG. 1). The wall portions 40 and the shaft portions 41 are formed integrally with the chassis 4 but may be formed separately from the chassis 4.

A plurality of wall portions 40 are arranged in the scale direction (refer to FIG. 1), and a protrusion portion 20 of the white key 2*a* is inserted between the plurality of wall portions 40 facing each other. In the following description, a pair of wall portions 40 (shaft portions 41) facing each other with the protrusion portion 20 sandwiched therebetween will be simply described as "a pair of wall portions 40 (shaft portions 41)" or the like.

The protrusion portion 20 is a part protruding to the rear side from a rear end portion of the white key 2*a*, and the protrusion portion 20 is formed to have a smaller dimension in the scale direction than a part of the white key 2*a* on a front end side (arrow F side) (a part to be pressed). An attachment member 6 having guide grooves 60 is attached to the protrusion portion 20. The attachment member 6 is a component fitted into an attachment hole 21 formed in the protrusion portion 20 (refer to FIGS. 7A and 7B). A method for attaching the attachment member 6 to this white key 2*a* (protrusion portion 20) will be described below.

The guide grooves 60 are formed on the respective side surfaces of the attachment member 6 on both sides in the scale direction, and the shaft portions 41 formed in the pair of wall portions 40 are fitted into the guide grooves 60. When the shaft portions 41 are fitted into the guide grooves 60, the protrusion portion 20 of the white key 2*a* is inserted between the pair of shaft portions 41 from above.

In the shaft portion 41, an inclined surface 42 is formed to be inclined such that an upper end of a tip surface thereof is obliquely cutoff (refer to the enlarged part in FIG. 1). When the protrusion portion 20 of the white key 2*a* is inserted between the pair of shaft portions 41 facing each other from above, the protrusion portion 20 slides along the inclined surfaces 42 of the shaft portions 41. Since the plate-shaped wall portions 40 are elastically deformed and a spacing between the pair of shaft portions 41 facing each other widens due to this sliding, the shaft portions 41 can be easily fitted into the guide grooves 60.

When the shaft portions 41 are fitted into the guide grooves 60, the white key 2*a* is slidably (swingably) supported between the pair of wall portions 40 facing each other. The hammer 7 interlocked with swinging of the white key 2*a* is provided below the white key 2*a*.

A rotation axis 43 lying in the scale direction (refer to FIG. 2) is formed in a substantially central part of the chassis 4 in the forward-rearward direction, and the hammer 7 is rotatably supported by this rotation axis 43. The hammer 7 includes a mass portion 70 (mass body) for giving a feeling of key pressing when the white key 2*a* is pressed, and the mass portion 70 is positioned on a side behind the rotation axis 43 (arrow B side).

A part of the hammer 7 on a side in front of the rotation axis 43 (arrow F side) is provided as a pressurization portion 71 for pressing a switch 80 of a substrate 8 when the white key 2*a* is pressed. The reception portion 72, which is recessed downward, is formed on an upper surface of the pressurization portion 71, and a projection portion 22, which is inserted into this reception portion 72, protrudes downward from a lower surface of the white key 2*a*.

Since the projection portion 22 is simply inserted into (placed on) the reception portion 72, when the white key 2*a* is assembled, the projection portion 22 is placed on the reception portion 72. Thereafter, as described above, it is sufficient to insert the protrusion portion 20 between the wall portions 40 facing each other and fit the shaft portions 41 into the guide grooves 60. Thus, assembly work of the white key 2*a* with respect to the chassis 4 can be easily performed.

Meanwhile, when the white key 2*a* is detached from the chassis 4, the wall portions 40 are elastically deformed (the wall portions 40 open wide) and the shaft portions 41 are removed from the guide grooves 60. Thereafter, it is sufficient to pull out the projection portion 22 from the reception portion 72. Thus, work of detaching the white key 2*a* can also be easily performed, and therefore maintainability of the white key 2*a* can be improved.

A lower surface of the projection portion 22 of the white key 2*a* is formed to have an arc shape projecting downward, and a bottom surface of the reception portion 72 of the hammer 7 is also similarly formed to have an arc shape projecting downward. Contact parts on the lower surface of the projection portion 22 and the bottom surface of the reception portion 72 have the same curvature, and the lower surface of the projection portion 22 and the bottom surface of the reception portion 72 come into surface contact with each other in an initial state (the state in FIG. 2) before the white key 2*a* is pressed (which will hereinafter be referred to as "an initial position before key pressing" or the like).

Figure 3:
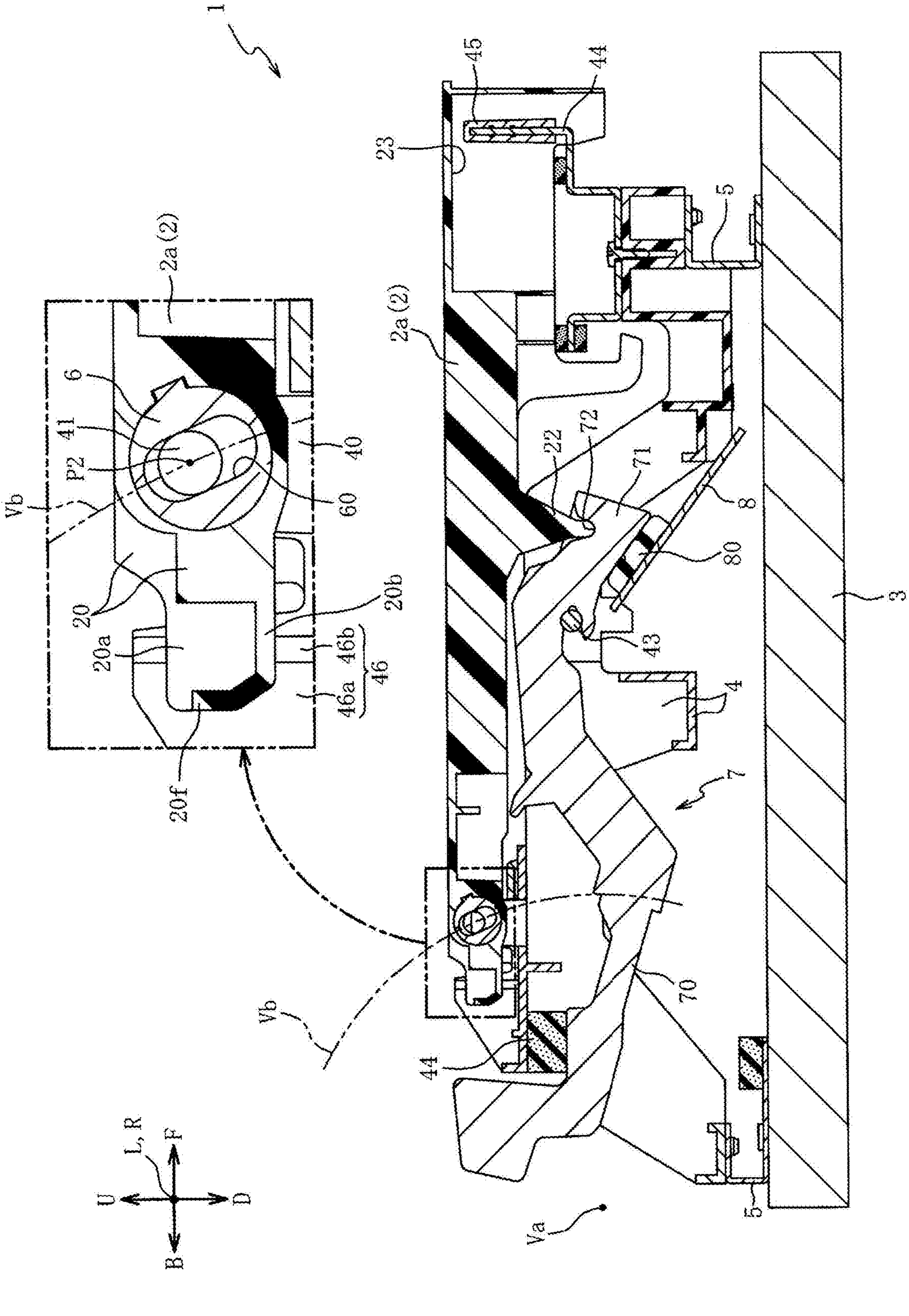
FIG. 3 is a cross-sectional view of the keyboard device showing a state in which a white key is pressed to an ending edge position from the state in FIG. 2.

Next, with reference to FIGS. 2 and 3, operation when the white key 2*a* is pressed will be described. FIG. 3 is a cross-sectional view of the keyboard device 1 showing a state in which the white key 2*a* is pressed to an ending edge position from the state in FIG. 2.

As shown in FIGS. 2 and 3, when the white key 2*a* is pressed from the initial position, while the lower surface of the projection portion 22 slides along the bottom surface of the reception portion 72, the pressurization portion 71 (reception portion 72) is pressed downward by the projection portion 22. Accordingly, the hammer 7 rotates around (clockwise in FIGS. 2 and 3) the rotation axis 43 (refer to FIG. 3).

The switch 80 is provided below the pressurization portion 71 of the hammer 7, and the switch 80 is pressed by the pressurization portion 71 in response to rotation of the hammer 7 when the white key 2*a* is pressed. Key pressing information (note information) of the white key 2*a* is detected by turning on and off this switch 80, and a musical tone signal based on this detection result is output to the outside.

In this manner, swinging of a part of the white key 2*a* on the front end side at the time of key pressing is guided by rotation of the hammer 7 around the rotation axis 43. Meanwhile, swinging of a part of the white key 2*a* on the rear end side (a rear portion of the white key 2*a* on a side behind the center in the forward-rearward direction) is guided by sliding in the guide grooves 60 along the shaft portions 41 of the chassis 4.

At the time of such vertical swinging of the white key 2*a*, since unstable movement may occur in the white key 2*a*, such as rotation of the white key 2*a* around an axis in the forward-rearward direction (so-called rolling), the chassis 4 is provided with a front guide 44 for making swinging of the white key 2*a* stable.

The front guide 44 is a plate-shaped metal fitting attached to the chassis 4. The front guide 44 rises upward from a front end portion of the chassis 4, and the front guide 44 is inserted into a recessed portion 23 formed on a lower surface of a front end portion of the white key 2*a*. A rubber cover 45 is mounted in the front guide 44, and when an inner surface of the recessed portion 23 (a surface facing the inward side in the scale direction) comes into contact with the cover 45, swinging of the front end portion of the white key 2*a* is guided.

Figure 4:
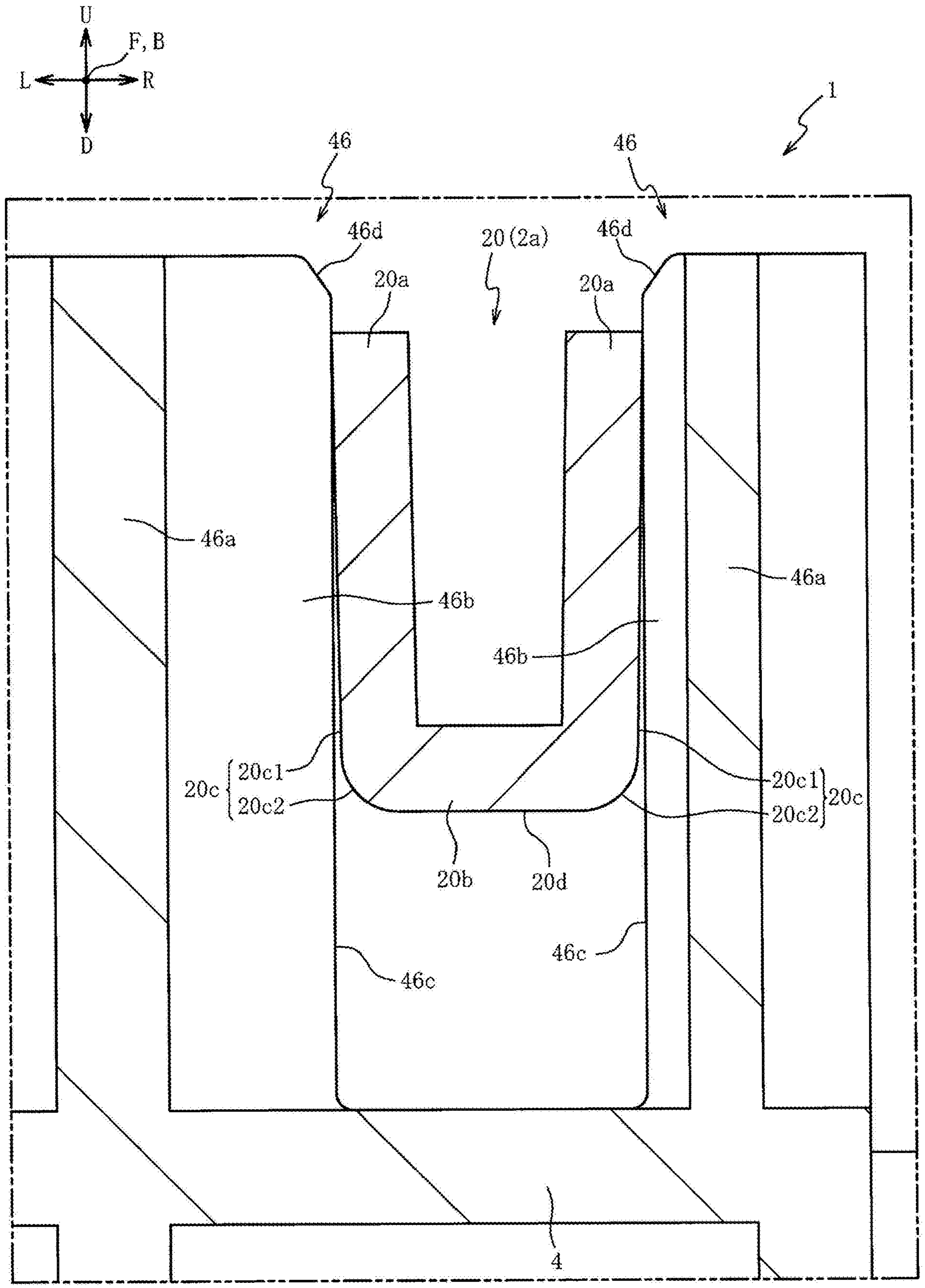
FIG. 4 is a partial enlarged cross-sectional view of the keyboard device along line IV-IV in FIG. 2.

The front guide 44 (cover 45) guides swinging of the white key 2*a* on a side in front of an engagement position between the white key 2*a* and the hammer 7, but swinging of a part of the white key 2*a* on the rear end side is guided by rear guides 46 (refer to the enlarged part in FIGS. 2 and 3). The rear guides 46 respectively include wall portions 46*a* which are formed on a side behind the shaft portions 41 of the chassis 4, and guide projecting portions 46*b* which protrude from side surfaces of the wall portions 46*a*. Vertical swinging of the white key 2*a* (protrusion portion 20) is guided by these guide projecting portions 46*b*. A detailed constitution of these rear guides 46 will be described with reference to FIG. 4. FIG. 4 is a partial enlarged cross-sectional view of the keyboard device 1 along line IV-IV in FIG. 2. FIG. 4 illustrates an end surface of the white key 2*a* (only a cross-sectional shape).

As shown in FIG. 4, the wall portions 46*a* of the rear guides 46 are each formed to have a wall shape rising upward from the chassis 4, and the guide projecting portions 46*b* protrude in the scale direction from these wall portions 46*a*. The wall portions 46*a* and the guide projecting portions 46*b* are formed integrally with the chassis 4 but may be formed separately from the chassis 4.

A plurality of wall portions 46*a* are arranged in the scale direction (arrow L-R direction), and the protrusion portion 20 of the white key 2*a* is sandwiched between a pair of guide projecting portions 46*b* provided between the plurality of wall portions 46*a* facing each other. In the following description, the pair of wall portions 46*a* (guide projecting portions 46*b*) facing each other with the protrusion portion 20 sandwiched therebetween will be simply described as "a pair of wall portions 46*a* (guide projecting portions 46*b*)" or the like.

The protrusion portion 20 is formed to have a box shape including a pair of side plates 20*a* facing each other in the scale direction, and a connection plate 20*b* connecting lower end portions of the pair of side plates 20*a* to each other in the scale direction. Tip surfaces of the guide projecting portions 46*b* (surfaces facing the side plates 20*a* side) serve as guide surfaces 46*c* guiding vertical swinging of the side plates 20*a*, and side surfaces of the protrusion portion 20 (outer surfaces of the side plates 20*a*) respectively facing the guide surfaces 46*c* in the scale direction serve as guided surfaces 20*c*.

The guide surfaces 46*c* are flat surfaces orthogonal to the scale direction, and cutouts 46*d*, which are inclined upward in directions in which they are separated from each other (protrusion portion 20 side), are respectively formed at upper ends of the pair of guide surfaces 46*c*. By forming such cutouts 46*d*, the insertion can be guided by the cutouts 46*d* when the protrusion portion 20 is inserted between the pair of guide projecting portions 46*b* facing each other from above.

The guided surfaces 20*c* of the white key 2*a* each include an inclined surface 20*c*1 which is inclined such that the spacing with respect to the guide surface 46*c* gradually widens from the upper end to the lower end side of the side plate 20*a*, and a curved surface 20*c*2 which is connected to a lower end of the inclined surface 20*cl*.

The inclined surface 20*c*1 is a flat surface inclined at an angle of 0.5° or larger and smaller than 1° with respect to the guide surface 46*c* (vertical direction), and the curved surface 20*c*2 is an arc-shaped curved surface connecting the lower end of the inclined surface 20*c*1 (the outer surface of the side plate 20*a*) and a lower surface 20*d* of the connection plate 20*b*.

FIG. 4 illustrates the initial state before the white key 2*a* is pressed. However, when the white key 2*a* is pressed from this state, the guided surfaces 20*c* (the inclined surfaces 20*c*1 and the curved surfaces 20*c*2) slide downward with respect to the guide surfaces 46*c*, and when the white key 2*a* is released from the key pressing state, the guided surfaces 20*c* slide upward with respect to the guide surfaces 46*c*.

Due to upward sliding of the guided surfaces 20*c* at the time of this key releasing, grease applied to the guide surfaces 46*c* and the guided surfaces 20*c* is scraped upward. However, in the present embodiment, this grease that has been scraped upward is likely to be retained in sliding regions between the guide surfaces 46*c* and the guided surfaces 20*c* (which will hereinafter be referred to as "sliding regions on the guided surfaces 20*c*").

Specifically, at the initial position before key pressing, the entire guided surfaces 20*c* (from upper ends of the inclined surfaces 20*c*1 to lower ends of the curved surfaces 20*c*2) face the guide surfaces 46*c* in the scale direction. Namely, the guided surfaces 20*c* (inclined surfaces 20*c*1) are provided not to protrude to the upward side beyond the guide surfaces 46*c* when the white key 2*a* returns to the initial position after having been pressed (the state in FIG. 4).

Accordingly, it is possible to curb a situation in which the grease that has been scraped upward due to swinging of the white key 2*a* is pushed out to the cutouts 46*d* or the upper surface sides of the guide projecting portions 46*b*. Further, since the grease that has been scraped upward flows downward along the guide surfaces 46*c* due to its own weight, the grease is likely to be retained in the sliding regions on the guided surfaces 20*c*. Thus, a feeling of pressing the white key 2*a* can be improved.

In addition, the spacings between the guide surfaces 46*c* and the guided surfaces 20*c* (the inclined surfaces 20*c*1 and the curved surfaces 20*c*2) are formed to gradually widen from the upper end sides to the lower ends of the guided surfaces 20*c*. Thus, slight gaps are formed between the guide surfaces 46*c* and the lower end portions of the guided surfaces 20*c*, and these gaps are formed to gradually increase toward the lower ends of the guided surfaces 20*c*. Accordingly, it is possible to curb a situation in which the grease is scraped off downward when the guided surfaces 20*c* slide downward with respect to the guide surfaces 46*c*. This also makes the grease be likely to be retained in the sliding regions on the guided surfaces 20*c*, and therefore a feeling of pressing the white key 2*a* can be improved.

Here, when it is intended to make the grease be unlikely to be scraped off, for example, the curved surfaces 20*c*2 can be omitted (the inclined surfaces 20*c*1 and the lower surface 20*d* of the connection plate 20*b* are extended and connected), and inclination angles of the inclined surfaces 20*c*1 with respect to the guide surfaces 46*c* can also be formed to be relatively large. However, in the case of such a constitution, since a rattle is more likely to occur in sliding of the guided surfaces 20*c* with respect to the guide surfaces 46*c* as the inclination angles of the inclined surfaces 20*c*1 with respect to the guide surfaces 46*c* increase, swinging of the white key 2*a* cannot be stably guided. On the other hand, as the inclination angles of the inclined surfaces 20*c*1 become close to parallel to the guide surfaces 46*c*, the grease is more likely to be scraped off downward when the white key 2*a* swings.

In contrast, the guided surfaces 20*c* of the present embodiment each include the inclined surface 20*c*1 which is a flat surface inclined with respect to the guide surface 46*c*, and the curved surface 20*c*2 which is connected to the lower end of the inclined surface 20*c*1. Since the curved surface 20*c*2 has a larger widening degree of the spacing with respect to the guide surface 46*c* than the inclined surface 20*c*1 and a relatively wide gap is formed between the curved surface 20*c*2 and the guide surface 46*c*, it is possible to effectively curb a situation in which the grease is scraped off due to this gap.

Namely, since a function of curbing scraping off of the grease is mainly imparted to the curved surfaces 20*c*2, the function of curbing scraping off of the grease can be sufficiently exhibited to that extent while the angles of the inclined surfaces 20*c*1 with respect to the guide surfaces 46*c* can be set close to parallel as much as possible. Thus, while occurrence of a rattle in sliding of the guided surfaces 20*c* with respect to the guide surfaces 46*c* is curbed, it is possible to curb a situation in which the grease is scraped off due to the sliding.

In the present embodiment, the widening degrees of the spacings between the guide surfaces 46*c* and the lower end portions of the guided surfaces 20*c* are increased by forming the curved surfaces 20*c*2 at the lower ends of the inclined surfaces 20*c*1, but the embodiment is not necessarily limited to this. For example, a constitution in which the curved surfaces 20*c*2 are inclined surfaces (flat surfaces) inclined with respect to the guide surfaces 46*c* and inclination angles of the inclined surfaces (angles with respect to the guide surfaces 46*c*) are larger than those of the inclined surfaces 20*c*1 may be adopted. In this constitution as well, while occurrence of a rattle in sliding of the guided surfaces 20*c* with respect to the guide surfaces 46*c* is curbed, it is possible to curb a situation in which the grease is scraped off due to the sliding.

Figure 5A:
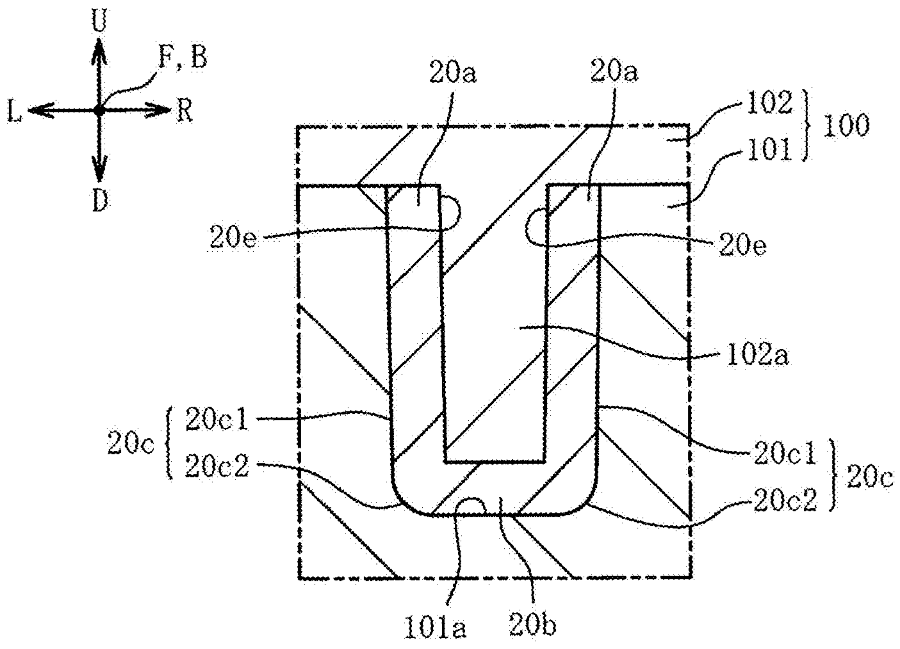
FIG. 5A is a cross-sectional view of a mold showing a situation of molding side plates and a connection plate.

Next, with reference to FIG. 5A, a method for molding the side plates 20*a* and the connection plate 20*b* (the protrusion portion 20 of the white key 2*a*) using a mold 100 will be described. FIG. 5A is a cross-sectional view of the mold 100 showing a situation of molding the side plates 20*a* and the connection plate 20*b*.

As shown in FIG. 5A, the mold 100 for molding the side plates 20*a* and the connection plate 20*b* includes a lower mold 101 and an upper mold 102. A recessed portion 101*a* is formed in the lower mold 101, and a projecting portion 102*a* which is inserted into this recessed portion 101*a* is formed in the upper mold 102. When the projecting portion 102*a* is inserted into the recessed portion 101*a*, a cavity having a shape corresponding to the pair of side plates 20*a* and the connection plate 20*b* is formed in the mold 100. After a heated and melted resin material is injected into this cavity through an injection port (not shown), the resin material is cooled (solidified), and the side plates 20*a* and the connection plate 20*b* are thereby molded.

The side plates 20*a* and the connection plate 20*b* which have been molded are separated from the mold 100. However, as described above, the inclined surfaces 20*c*1 forming the side surfaces of the side plates 20*a* have an angle of 0.5° or larger and smaller than 1°, and this inclination also functions as a draft for separating the side plates 20*a* from the recessed portion 101*a* of the lower mold 101.

In addition, inner surfaces 20*e* of the side plates 20*a* facing each other between the pair of side plates 20*a* are also similarly inclined at an angle parallel to the inclined surfaces 20*c*1, and this inclination also serves as a draft for separating the side plates 20*a* from the projecting portion 102*a* of the upper mold 102.

When the white key 2*a* is molded using such a resin material, there is a need for each of the portions of the white key 2*a* to have a plate thickness of 2 to 3 mm in order to prevent deterioration in moldability thereof. In this case, as in a white key 202*a* of a first modification example shown in FIG. 5B, if a protrusion portion 220 is formed to have a single plate shape, it becomes difficult to ensure the rigidity of the protrusion portion 220. If the protrusion portion 220 has a low rigidity, since the protrusion portion 220 sandwiched between guide projecting portions 246*b* is likely to be deformed when the white key 202*a* swings, there may be a problem that swinging of the white key 202*a* cannot be stably guided or a problem that the protrusion portion 220 is likely to be damaged.

In contrast, the protrusion portion 20 of the present embodiment is formed to have a box shape including the pair of side plates 20*a* of which outer surfaces directed in the scale direction are formed as the guided surfaces 20*c*, and the connection plate 20*b* which connects the pair of side plates 20*a* to each other in the scale direction. Accordingly, when the white key 2*a* is molded with a mold using a resin material, that is, even when the thickness of each of the plates 20*a* and 20*b* of the protrusion portion 20 is limited 2 to 3 mm, the rigidity of the protrusion portion 20 can be ensured. Swinging of the white key 2*a* can be stably guided and damage to the protrusion portion 20 can be curbed by ensuring the rigidity of the protrusion portion 20.

Figure 6C:
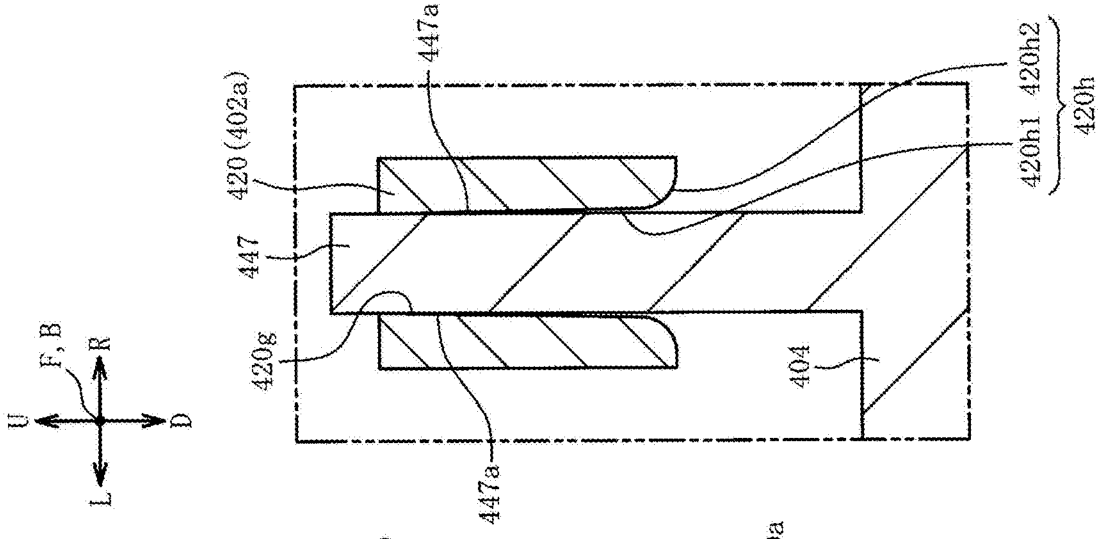
FIG. 6C is a cross-sectional view of a white key of a third modification example.
Figure 6B:
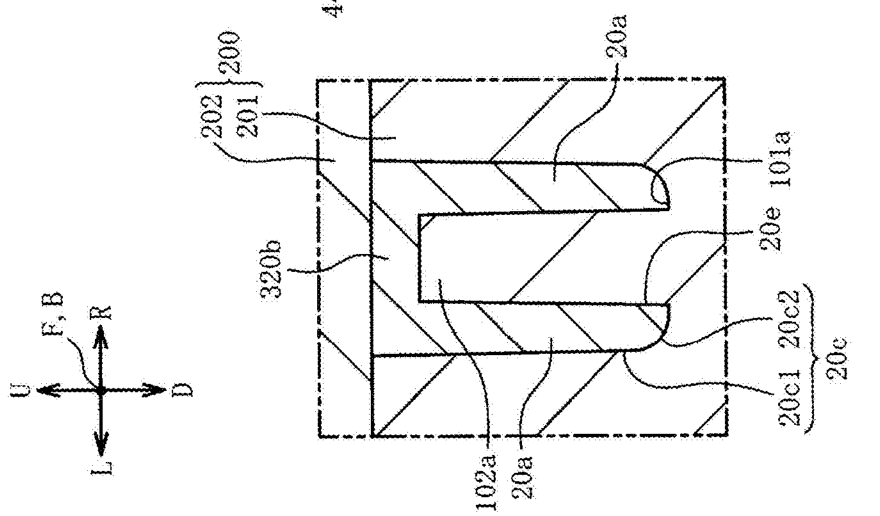
FIG. 6B is a cross-sectional view of a mold showing a situation of molding the side plates and the connection plate using the mold.
Figure 6A:
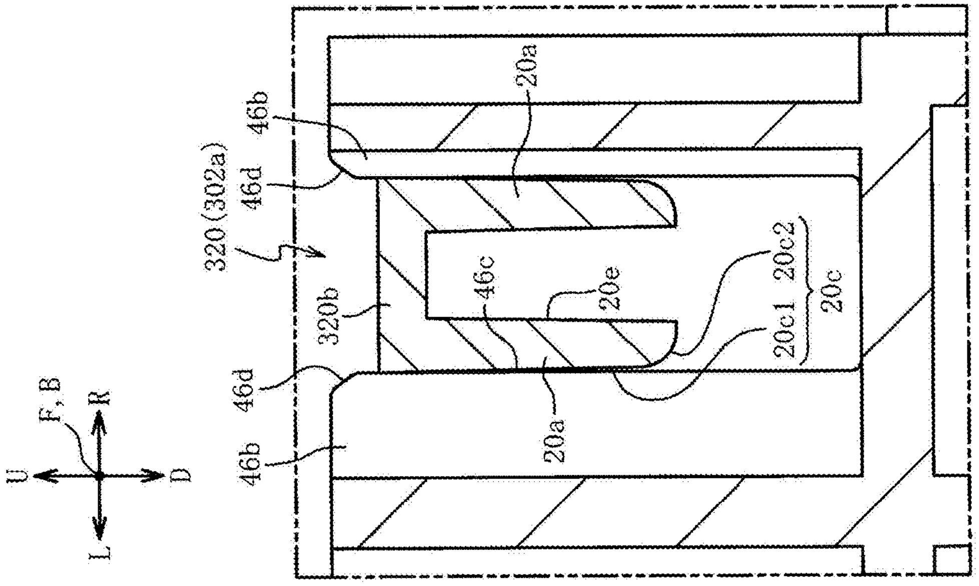
FIG. 6A is a cross-sectional view of a white key of a second modification example.

Here, when it is intended to form the protrusion portion 20 of the white key 2*a* in a box shape, for example, as in a white key 302*a* of a second modification example shown in FIG. 6A, upper ends of the side plates 20*a* of a protrusion portion 320 can also be connected to each other by a connection plate 320*b*. A method for molding such a protrusion portion 320 using a mold 200 will be described below with reference to FIG. 6B. However, if the protrusion portion 320 is provided with a draft for the time of molding using the mold 200, there is a need for the side plates 20*a* to be formed with a tapered plate thickness. Thus, there is a problem that moldability of the protrusion portion 320 deteriorates or a problem that the rigidity of the protrusion portion 320 is degraded.

In contrast, in the present embodiment, as shown in FIG. 5A, the protrusion portion 20 is formed to have a box shape by connecting the lower ends of the pair of side plates 20*a* to each other by the connection plate 20*b*, and the spacing between the inner surfaces 20*e* of the pair of side plates 20*a* is formed to gradually narrow toward the lower end sides of the side plates 20*a*. Accordingly, since the plate thicknesses of the side plates 20*a* can be made substantially uniform (the inclined surfaces 20*c*1 and the inner surfaces 20*c* of the side plates 20*a* can be formed substantially parallel to each other) while drafts with respect to the lower mold 101 and the upper mold 102 are formed on the side plates 20*a*, moldability of the protrusion portion 20 can be improved. Moreover, since the rigidity of the protrusion portion 20 can be ensured by forming the side plates 20*a* having a uniform plate thickness, swinging of the white key 2*a* can be stably guided.

In this manner, in the present embodiment, the rear end side of the protrusion portion 20 is formed to have a box shape by the pair of side plates 20*a* and the connection plate 20*b*. However, a rear end side of a space surrounded by each of these plates 20*a* and 20*b* is closed by a closing plate 20*f* (refer to the enlarged part in FIG. 3). A lower end of the closing plate 20*f* is connected to the connection plate 20*b*, and both ends of the closing plate 20*f* in the scale direction (arrow L-R direction in FIG. 3) are connected to the pair of side plates 20*a*. Since the rigidity of the protrusion portion 20 can be improved by providing such a closing plate 20*f*, swinging of the white key 2*a* can be stably guided.

Figure 5B:
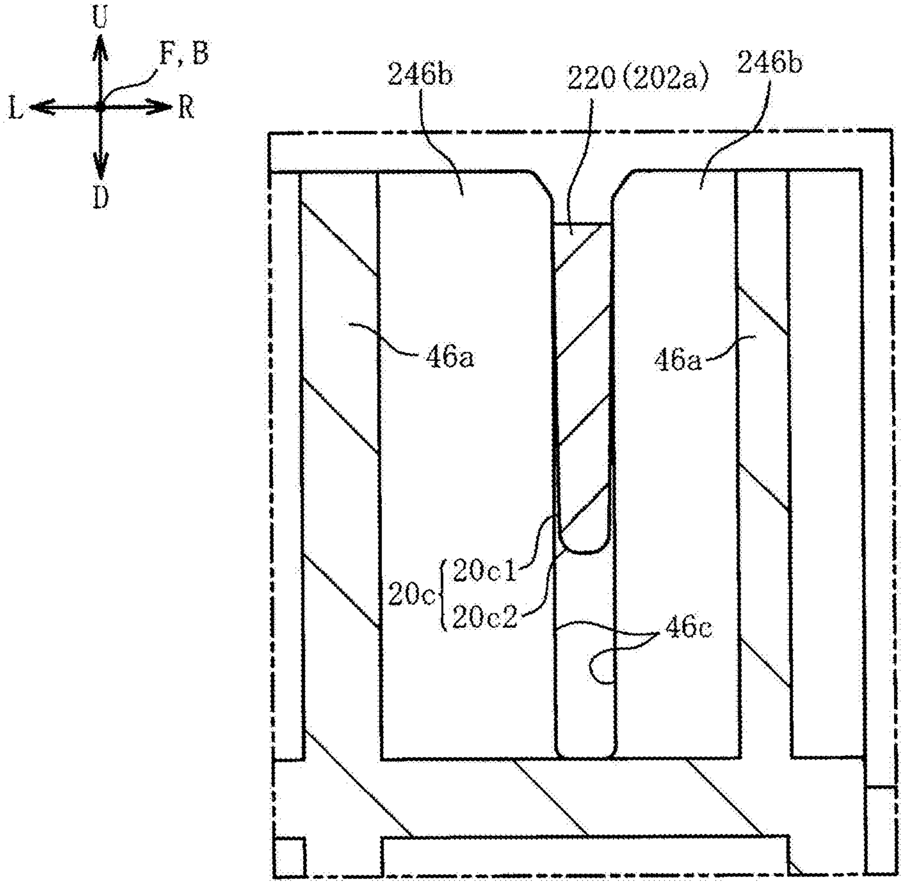
FIG. 5B is a cross-sectional view showing a white key of a first modification example.

Next, with reference to FIG. 5B, the white key 202*a* of the first modification example will be described. The same reference signs are applied to parts which are the same as those in the foregoing embodiment, and description thereof will be omitted. FIG. 5B is a cross-sectional view of the white key 202*a* of the first modification example. FIG. 5B illustrates a cross section of the keyboard device 1 (refer to FIG. 2) cut at a position corresponding to that in FIG. 4.

As shown in FIG. 5B, in the white key 202*a* of the first modification example, the protrusion portion 220 is formed to have a single plate shape, and the guided surfaces 20*c* (the inclined surfaces 20*c*1 and the curved surfaces 20*c*2) described in the foregoing embodiment are formed on the side surfaces of the plate-shaped protrusion portion 220.

The pair of guide projecting portions 246*b* sandwiching this protrusion portion 220 therebetween from both sides in the scale direction have the same constitution as those of the guide projecting portions 46*b* (refer to FIG. 4) described in the foregoing embodiment except that protrusion lengths from the wall portions 46*a* are lengthened. Namely, the guide surfaces 46*c* similar to those in the foregoing embodiment are formed on tip surfaces of the guide projecting portions 246*b*.

In this white key 202*a* of the first modification example as well, at the initial position before key pressing, the entire guided surfaces 20*c* (the inclined surfaces 20*c*1 and the curved surfaces 20*c*2) face the guide surfaces 46*c*. Accordingly, when the pressed white key 202*a* returns to the initial position (the state in FIG. 5B), it is possible to curb a situation in which the grease that has been scraped up by the white key 202*a* is pushed out to the cutouts 46*d* or the upper surface sides of the guide projecting portions 246*b*. Thus, the grease is likely to be retained in the sliding regions on the guided surfaces 20*c*.

In addition, since the spacings between the guide surfaces 46*c* and the guided surfaces 20*c* (the inclined surfaces 20*c*1 and the curved surfaces 20*c*2) gradually widen from the upper end sides to the lower ends of the guided surfaces 20*c*, even if the guided surfaces 20*c* slide downward with respect to the guide surfaces 46*c* when the white key 202*a* is pressed, the grease applied to each of these surfaces 20*c* and 46*c* is unlikely to be scraped off downward. This also makes the grease be likely to be retained in the sliding regions on the guided surfaces 20*c*.

Next, with reference to FIGS. 6A and 6B, the white key 302*a* of the second modification example will be described. FIG. 6A is a cross-sectional view of the white key 302*a* of the second modification example, and FIG. 6B is a cross-sectional view of the mold 200 showing a situation of molding the side plates 20*a* and the connection plate 320*b* using the mold 200. FIG. 6A illustrates a cross section of the keyboard device 1 (refer to FIG. 2) cut at a position corresponding to that in FIG. 4.

The white key 302*a* of the second modification example has the same constitution as the white key 2*a* (refer to FIG. 4) described in the foregoing embodiment except that the connection plate 320*b* of the protrusion portion 320 connects the upper ends of the side plates 20*a* to each other in the scale direction.

That is, the protrusion portion 320 is formed to have a box shape having an opening on the lower surface side, and the guided surfaces 20*c* are formed on the side surfaces of this box-shaped protrusion portion 320 (side plates 20*a*). End portions of the curved surfaces 20*c*2 of the guided surfaces 20*c* on the inward sides in the scale direction are connected to the lower ends on the inner surfaces 20*e* of the side plates 20*a*.

In this white key 302*a* of the second modification example as well, at the initial position before key pressing, the entire guided surfaces 20*c* (the inclined surfaces 20*c*1 and the curved surfaces 20*c*2) face the guide surfaces 46*c*. Accordingly, when the pressed white key 302*a* returns to the initial position (the state in FIG. 6A), it is possible to curb a situation in which the grease that has been scraped up by the white key 302*a* is pushed out to the cutouts 46*d* or the upper surface sides of the guide projecting portions 46*b*. Thus, the grease is likely to be retained in the sliding regions on the guided surfaces 20*c*.

In addition, since the spacings between the guide surfaces 46*c* and the guided surfaces 20*c* (the inclined surfaces 20*c*1 and the curved surfaces 20*c*2) gradually widen from the upper end sides to the lower ends of the guided surfaces 20*c*, even if the guided surfaces 20*c* slide downward with respect to the guide surfaces 46*c* when the white key 302*a* is pressed, the grease applied to each of these surfaces 20*c* and 46*c* is unlikely to be scraped off downward. This also makes the grease be likely to be retained in the sliding regions on the guided surfaces 20*c*.

As shown in FIG. 6B, in the mold 200 for molding the side plates 20*a* and the connection plate 320*b*, the projecting portion 102*a* (refer to FIG. 5A) described in the foregoing embodiment is omitted from an upper mold 202, and the projecting portion 102*a* is formed on a bottom surface of the recessed portion 101*a* of a lower mold 201 (in a manner of being vertically inverted).

When such a projecting portion 102*a* is formed in the lower mold 201, in order to form drafts with respect to the lower mold 201 on the side plates 20*a*, there is a need for the inner surfaces 20*e* of the side plates 20*a* to be inclined in a direction in which they approach the inclined surfaces 20*c*1 from the upper ends to the lower ends thereof. Namely, the lower end sides of the side plates 20*a* have a tapered shape. Thus, when it is desired to further ensure the rigidity of the protrusion portion 320 or when it is desired to improve the moldability of the protrusion portion 320, as in the foregoing embodiment (refer to FIG. 5A), it is preferable to connect the lower ends of the side plates 20*a* to each other by the connection plate 20*b*.

Next, with reference to FIG. 6C, a white key 402*a* of a third modification example will be described. FIG. 6C is a cross-sectional view of the white key 402*a* of the third modification example. FIG. 6C illustrates a cross section of the keyboard device 1 (refer to FIG. 2) cut at a position corresponding to that in FIG. 4.

As shown in FIG. 6C, in the white key 402*a* of the third modification example, a vertically extending insertion hole 420*g* is formed in a protrusion portion 420, and a pillar-shaped rear guide 447 rising upward from the chassis 4 is inserted into this insertion hole 420*g*.

Guide surfaces 447*a* facing both sides of the rear guide 447 in the scale direction are flat surfaces orthogonal to the scale direction. A pair of inner surfaces facing the inward sides of the insertion hole 420*g* in the scale direction are guided surfaces 420*h* respectively facing the guide surfaces 447*a*.

The guided surfaces 420*h* each include an inclined surface 420*h*1 which is inclined such that the spacing with respect to the guide surface 447*a* gradually widens from the upper end thereof to the lower end side, and a curved surface 420*h*2 which is connected to the lower end of the inclined surface 420*h*1.

The inclined surface 420*h*1 is a flat surface inclined at an angle of 0.5° or larger and smaller than 1° with respect to the guide surface 447*a* (vertical direction), and the curved surface 420*h*2 is an arc-shaped curved surface connecting the lower end of the inclined surface 420*h*1 and the side surface of the protrusion portion 420.

In this white key 402*a* of the third modification example as well, at the initial position before key pressing, the entire guided surfaces 420*h* (the inclined surfaces 420*h*1 and the curved surfaces 420*h*2) face the guide surfaces 447*a*. Accordingly, when the pressed white key 402*a* returns to the initial position (the state in FIG. 6C), it is possible to curb a situation in which the grease that has been scraped up by the protrusion portion 420 is pushed out to the upper surface side of the rear guide 447. Thus, the grease is likely to be retained in the sliding regions on the guided surfaces 420*h*.

In addition, the spacings between the guide surfaces 447*a* and the guided surfaces 420*h* (the inclined surfaces 420*h*1 and the curved surfaces 420*h*2) are formed to gradually widen from the upper end sides to the lower ends of the guided surfaces 420*h*. Thus, slight gaps are formed between the guide surfaces 447*a* and the lower end portions of the guided surfaces 420*h*, and these gaps are formed to gradually increase toward the lower ends of the guided surfaces 420*h*. Accordingly, even if the guided surfaces 420*h* slide downward with respect to the guide surfaces 447*a* when the white key 402*a* is pressed, the grease applied to each of these surfaces 420*h* and 447*a* is unlikely to be scraped off downward. This also makes the grease be likely to be retained in the sliding regions on the guided surfaces 420*h*.

Description will return to FIGS. 2 and 3. As described above, swinging of the rear end portion of the white key 2*a* is guided by sliding in the guide grooves 60 along the shaft portions 41 of the chassis 4. The attachment member 6 having these guide grooves 60 formed therein is formed using a resin material (for example, an elastomer or rubber) having flexibility. That is, since the attachment member 6 is formed using a soft material having a lower hardness than a resin (for example, an ABS resin) which will become a material of the white key 2*a* and the chassis 4, for example, compared to when the attachment member 6 is formed using a material which is the same as that (relatively hard) of the white key 2*a* and the chassis 4, it is possible to curb occurrence of noise at the time of sliding in the guide grooves 60 along the shaft portions 41 of the chassis 4. Thus, it is possible to give a favorable feeling of playing to a player.

Here, at the initial position before key pressing, a point where the centers of the shaft portions 41 are positioned will be described as a starting point P1 of the guide grooves 60 (refer to the enlarged part in FIG. 2), and at the ending edge position of key pressing, a point where the centers of the shaft portions 41 are positioned will be described as an ending point P2 of the guide grooves 60 (refer to the enlarged part in FIG. 3).

The guide grooves 60 extend in a linear shape in a manner of being inclined downward to a front lower side in a side view, and the starting point P1 is positioned on a lower side in front of the ending point P2. In addition, both the starting point P1 and the ending point P2 of the guide grooves 60 are positioned on a virtual circle Vb about a virtual rotation axis of the white key 2*a* (which will hereinafter be referred to as "a virtual axis Va").

The virtual axis Va is a point positioned on a lower side behind the shaft portions 41 in a side view and is a point indicating the same position as a swing fulcrum (rotation axis) of a key of an acoustic piano. Thus, when the white key 2*a* is pressed, the white key 2*a* can swing in a displacement trajectory close to that of a key of an acoustic piano due to sliding in the guide grooves 60 along the shaft portions 41. Therefore, it is possible to give a feeling of playing close to that of an acoustic piano to a player.

In a state in which the shaft portions 41 are positioned at the starting point P1 of the guide grooves 60 (refer to the enlarged part in FIG. 2), gaps are formed between the shaft portions 41 and inner circumferential surfaces of the guide grooves 60 on a starting edge (lower end) side. Meanwhile, similarly, in a state in which the shaft portions 41 are positioned at the ending point P2 of the guide grooves 60 (refer to the enlarged part in FIG. 3), gaps are formed between the shaft portions 41 and the inner circumferential surfaces of the guide grooves 60 on an ending edge (upper end) side.

Namely, when regions in which the shaft portions 41 slide from the starting point P1 to the ending point P2 on the inner circumferential surfaces of the guide grooves 60 are sliding surfaces of the guide grooves 60, outer circumferential surfaces of the shaft portions 41 come into contact with only the sliding surfaces of the guide grooves 60 respectively at the initial position before key pressing and the ending edge position of key pressing. Accordingly, when the white key 2*a* is pressed to the ending edge position or when the white key 2*a* returns to the initial position from the ending edge position, it is possible to curb a situation in which the shaft portions 41 come into contact (collide) with the inner circumferential surfaces of the guide grooves 60 on the starting edge side or the ending edge side. Thus, since noise caused by the contact can also be curbed, it is possible to give a favorable feeling of playing to a player.

Figure 7A:
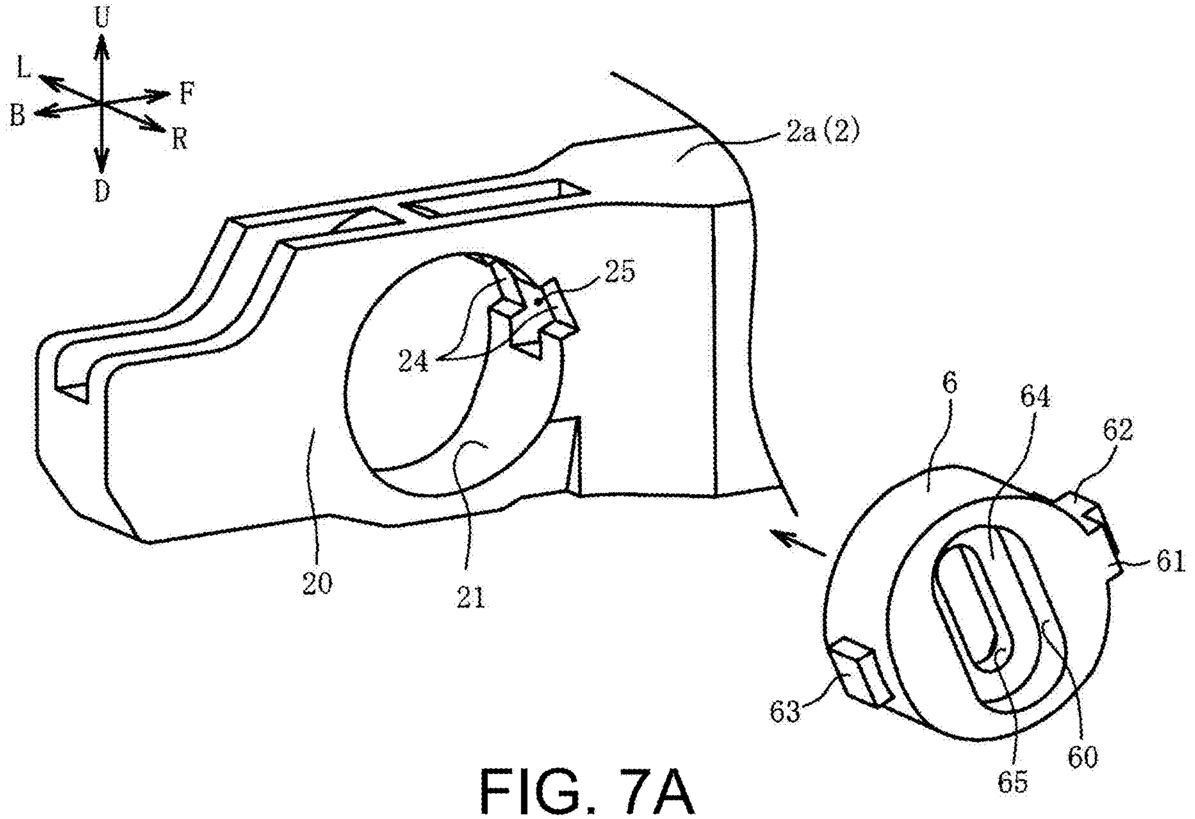
FIG. 7A is a perspective view of the white key showing a state in which an attachment member is detached through an attachment hole.
Figure 7B:
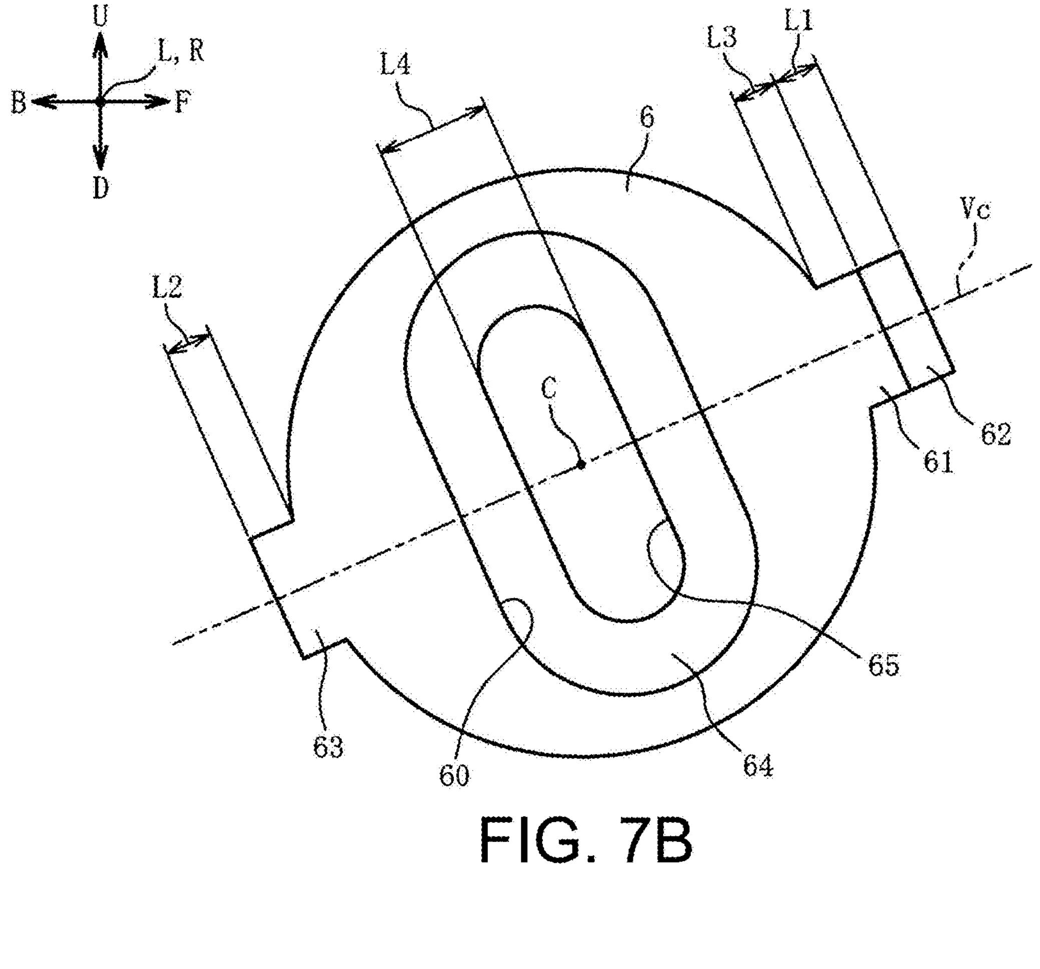
FIG. 7B is a side view of the attachment member.
Figure 8A:
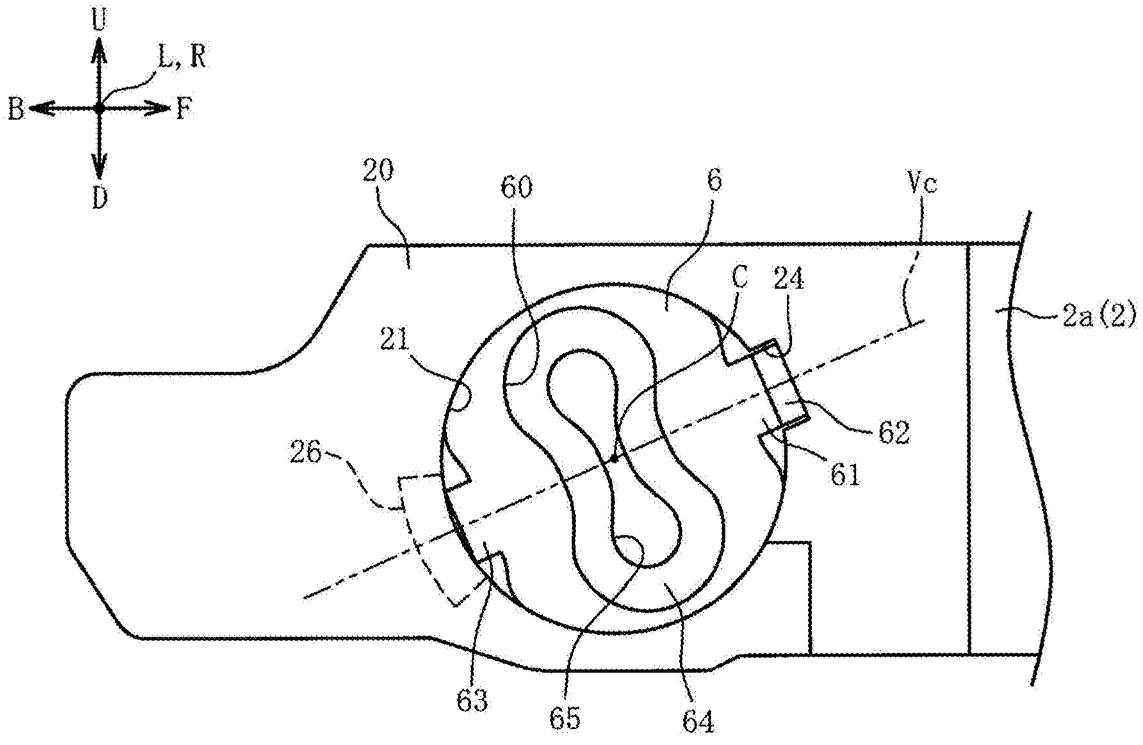
FIG. 8A is a side view of the white key showing a situation in which the attachment member is inserted into the attachment hole while being elastically deformed.
Figure 8B:
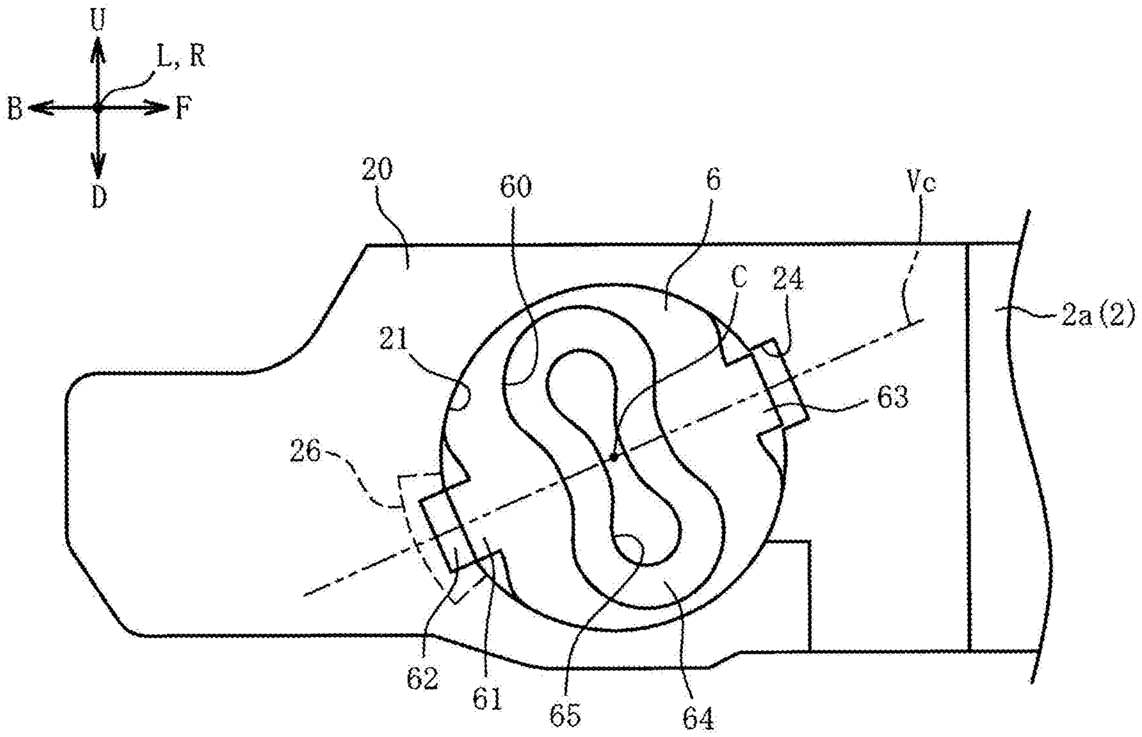
FIG. 8B is a side view of the white key showing a situation in which the attachment member is inverted about the center thereof and is inserted into the attachment hole.

Next, with reference to FIGS. 7 and 8, a detailed constitution of the attachment member 6 will be described. FIG. 7A is a perspective view of the white key 2*a* showing a state in which the attachment member 6 is detached from the attachment hole 21, and FIG. 7B is a side view of the attachment member 6. FIG. 8A is a side view of the white key 2*a* showing a situation in which the attachment member 6 is inserted into the attachment hole 21 while being elastically deformed, and FIG. 8B is a side view of the white key 2*a* showing a situation in which the attachment member 6 is inverted around a center C thereof and is inserted into the attachment hole 21.

As shown in FIGS. 7A and 7B, the attachment hole 21 having a circular cross section for fitting the attachment member 6 is formed in the protrusion portion 20 of the white key 2*a*, and the attachment member 6 is formed to have a columnar external shape (a shape corresponding to the attachment hole 21) with a center axis in the scale direction. In the following description, a direction around the outer circumferential surface of the attachment member 6 and a direction around the inner circumferential surface of the attachment hole 21 will be described as a circumferential direction.

First projections 61 and second projections 62 and 63 each having a rectangular parallelepiped shape are integrally formed on the outer circumferential surface of the attachment member 6. The first projections 61 are projection for restricting rotation of the attachment member 6 with respect to the attachment hole 21, and the second projections 62 and 63 are projections for restricting falling off of the attachment member 6 from the attachment hole 21.

The first projections 61 are formed at one location in the circumferential direction of the attachment member 6, and the second projections 62 and 63 are formed at two locations in the circumferential direction of the attachment member 6. One second projection 62 of the pair of second projections 62 and 63 protrudes from a central part on the outer circumferential surface (tip surface) of the first projections 61 in the scale direction, and the other second projection 63 protrudes in a direction opposite to the second projection 62 (first projections 61) from a central part on the outer circumferential surface of the attachment member 6 in the scale direction.

The first projections 61 extend in the scale direction in a manner of respectively leading to the pair of side surfaces of the attachment member 6. Meanwhile, the second projections 62 and 63 are formed to have a smaller dimension in the scale direction than the first projections 61 (attachment member 6).

On the inner circumferential surface of the attachment hole 21, fitting holes 24 are formed at positions corresponding to the first projections 61, and fitting holes 25 and 26 are formed at positions corresponding to the second projections 62 and 63 (refer to FIG. 8 for the fitting hole 26).

A pair of fitting holes 24 are formed with the fitting hole 25, into which the second projection 62 is inserted, sandwiched therebetween (side by side in the scale direction), and this pair of fitting holes 24 lead to the side surfaces of the protrusion portion 20 of the white key 2*a* (exposed to the side surfaces of the protrusion portion 20). Since the inner diameter of the attachment hole 21 of the white key 2*a* is formed to be slightly larger than the outer diameter of the attachment member 6 (the diameter in a region where the projections 61 to 63 are not formed), for example, if the attachment member 6 has a shape with no second projections 62 and 63, the attachment member 6 can be inserted into the attachment hole 21 (the first projections 61 can be inserted into the fitting holes 24) without having the attachment member 6 elastically deformed.

Meanwhile, in the present embodiment, since the second projections 62 and 63 are formed in the attachment member 6, when the attachment member 6 is intended to be inserted into the attachment hole 21 without being elastically deformed, the second projections 62 and 63 will be caught on the side surfaces of the white key 2*a* (protrusion portion 20).

Thus, when the projections 61 to 63 of the attachment member 6 are respectively fitted into the fitting holes 24 to 26 of the attachment hole 21, as shown in FIG. 8A, the attachment member 6 is inserted into the attachment hole 21 while being elastically deformed (compressed) such that the region having the second projections 62 and 63 formed therein is recessed as much as at least a total protrusion dimension L1+L2 (refer to FIG. 7B) of the second projections 62 and 63. Further, when the attachment member 6 is inserted to a position where the second projections 62 and 63 reach the fitting holes 25 and 26, the elastically deformed shape of the attachment member 6 is restored, and therefore the projections 61 to 63 are respectively fitted into the fitting holes 24 to 26. Accordingly, attachment of the attachment member 6 to the attachment hole 21 is completed.

The dimensions of the fitting holes 24 in the circumferential direction of the attachment hole 21 are formed to be the same as (or slightly larger than) the dimensions of the first projections 61 in the same direction. Meanwhile, the dimensions of the fitting holes 25 and 26 in the circumferential direction of the attachment hole 21 are formed to be larger than those of the second projections 62 and 63 in the same direction. Thus, when the attachment member 6 is inserted into the attachment hole 21 while being elastically deformed, the second projections 62 and 63 can be fitted into the fitting holes 25 and 26 even in a state in which the relative positions of the fitting holes 24 and the first projections 61 in the circumferential direction are shifted to some extent.

If the attachment member 6 is restored to the original shape in a state in which the relative positions of the fitting holes 24 and the first projections 61 are shifted, although the first projections 61 are in a state of being pressurized by (caught on) the inner circumferential surface of the attachment hole 21, the attachment member 6 is rotated around the center C thereof until the relative positions of the fitting holes 24 and the first projections 61 coincide with each other, and therefore the first projections 61 can be fitted into the fitting holes 24 due to a restoring force of the attachment member 6. Thus, for example, compared to when the dimensions of the fitting holes 25 and 26 and the second projections 62 and 63 in the circumferential direction coincide with each other, since the projections 61 to 63 can be easily fitted into the fitting holes 24 to 26 respectively, workability of attachment work of the attachment member 6 can be improved.

In this manner, the present embodiment has a structure in which the attachment member 6 having the guide grooves 60 formed on the side surfaces is attached to the white key 2*a* (protrusion portion 20). Accordingly, for example, since the mold for molding the white key 2*a* can be simplified compared to a constitution in which the guide grooves 60 having flexibility are formed integrally with the white key 2*a* by two-color molding, manufacturing costs of the white key 2*a* can be reduced.

In addition, when the attachment member 6 having the guide grooves 60 is formed separately from the white key 2*a*, for example, as in a white key 602*a* of a fifth modification example (refer to FIGS. 13A and 13B) which will be described below, it is also possible to employ a constitution in which an attachment member 606 formed to have an annular shape is fitted into a protrusion portion 620 of the white key 602*a*. In the case of such a constitution, although details will be described below, there is a need for the attachment member 606 to be pressed to the protrusion portion 620 side over projection-shaped second restriction portions 628, and this pressing relatively requires a force. Since the attachment member 606 is a small-sized component which is handled by a worker with finger tips, in a structure in which the annular attachment member 606 is attached by being pressed to the protrusion portion 620 side, attachment work thereof requires time and effort.

In contrast, as shown in FIGS. 7A and 7B, the present embodiment has a structure in which the attachment hole 21 provided to allow the attachment member 6 to be inserted thereinto is formed in the white key 2*a* and the attachment member 6 is fitted into this attachment hole 21. When this fitting is performed, although there is a need for the attachment member 6 to be elastically deformed as shown in FIG. 8A, this clastic deformation can be relatively easily performed by a worker compressing the attachment member 6 while grasping it with finger tips. Thus, workability of attachment work of the attachment member 6 with respect to the attachment hole 21 can be improved.

In addition, the present embodiment has a structure in which the attachment member 6 is attached to the white key 2*a*. However, for example, it is also possible to employ a constitution in which attachment holes for attaching the attachment member 6 are formed in the wall portions 40 of the chassis 4 (refer to FIG. 1) and a guide shaft (a part corresponding to the shaft portions 41) which can be inserted into the guide grooves 60 of the attachment member 6 is provided in the protrusion portion 20 of the white key 2*a*. However, since a plurality of wall portions 40 of the chassis 4 are integrally formed side by side in the scale direction, in a structure in which the attachment member 6 is attached to each of the wall portions 40, attachment work thereof requires time and effort.

In contrast, the present embodiment has a constitution in which the attachment hole 21 for attaching the attachment member 6 is formed in the white key 2*a*, and each of the white keys 2*a* arranged in the scale direction can be detached from the chassis 4. Thus, since work of attaching the attachment member 6 to the attachment hole 21 can be individually performed for each of the white keys 2*a* in a state in which the white key 2*a* has been detached from the chassis 4, workability of attachment work of the attachment member 6 can be improved.

In a state in which the attachment member 6 is attached to the attachment hole 21, change in attachment angle of the attachment member 6 in the circumferential direction of the attachment hole 21 is restricted due to the first projections 61 caught by the fitting holes 24. In addition, falling off of the attachment member 6 from the attachment hole 21 is restricted due to the second projections 62 and 63 caught by the fitting holes 25 and 26.

Regarding another constitution for restricting such change in attachment angle or falling off of the attachment member 6, a constitution in which each of the projections 61 to 63 (fitting holes 24 to 26) is omitted and the attachment member 6 is adhered to the attachment hole 21 is described as an example. However, in this constitution, attachment work of the attachment member 6 with respect to each of the white keys 2*a* requires time and effort.

In contrast, the present embodiment has a constitution in which the first projections 61 and the fitting holes 24 (positioning portions) including unevenness that can be fitted to each other, the second projections 62 and 63, and the fitting holes 25 and 26 (restriction portions) are formed with respect to the inner circumferential surface of the attachment hole 21 and the outer circumferential surface of the attachment member 6. By restricting change in attachment angle or falling off of the attachment member 6 due to fitting of the unevenness, work of adhering the attachment member 6 to each of the white keys 2*a* can be made unnecessary. Thus, workability of attachment work of the attachment member 6 can be improved.

In addition, regarding another constitution for restricting change in attachment angle or falling off of the attachment member 6, a constitution in which walls are formed at edges of the fitting holes 24 on the outer sides in the scale direction and falling off of the attachment member 6 is restricted due to these walls catching the first projections 61 is described as an example. In the case of such a constitution, since both change in attachment angle of the attachment member 6 and falling off of the attachment member 6 can be restricted by the first projections 61, the second projections 62 and 63 (fitting holes 25 and 26) can also be omitted. However, if walls are formed at the edges of the fitting holes 24 on the outer sides in the scale direction, since it becomes difficult to ascertain the positions of the fitting holes 24 when the white key 2*a* is viewed from the side surface side, work of fitting the first projections 61 into the fitting holes 24 requires time and effort.

In contrast, in the present embodiment, the fitting holes 24 are formed along the edges of the attachment hole 21 on the opening sides (outer sides in the scale direction). That is, since the fitting holes 24 are exposed to the side surfaces of the white key 2*a* (protrusion portion 20), it is easy to ascertain the positions of the fitting holes 24 when the white key 2*a* is viewed from the side surface side. Accordingly, since the first projections 61 can be easily fitted into the fitting holes 24, workability of attachment work of the attachment member 6 can be improved.

Here, a straight line connecting the centers of the second projections 62 and 63 in the circumferential direction of the attachment member 6 to each other will be regarded as a virtual line Vc. Since the guide grooves 60 extend in a manner of intersecting (being orthogonal to) the virtual line Vc in a side view of the attachment member 6, when the attachment member 6 is compressed as described above (refer to FIG. 8A), the attachment member 6 is elastically deformed such that groove widths of the guide grooves 60 narrow. In compression of the attachment member 6 in a direction in which the groove widths of the guide grooves 60 narrow, the attachment member 6 is likely to be elastically deformed compared to when the attachment member 6 is compressed in a longitudinal direction of the guide grooves 60. Thus, workability of attachment work of the attachment member 6 can be improved.

In the present embodiment, the first projections 61 are disposed on the virtual line Vc (the second projection 62 is formed in a manner of overlapping the first projections 61). However, for example, the first projections 61 can also be formed at positions different from that of the second projection 62 in the circumferential direction of the attachment member 6. In this case, the positions of the fitting holes 24 may be changed in accordance with disposition of the first projections 61.

However, if the first projections 61 are formed at positions different from that of the second projection 62, when the attachment member 6 is elastically deformed so as to fit the second projections 62 and 63 into the fitting holes 25 and 26, change is likely to occur in the direction of the first projections 61 (a relative direction with respect to the fitting holes 24) due to distortion of the attachment member 6. Thus, when the attachment member 6 is inserted into the attachment hole 21, the first projections 61 are likely to be caught by the side surfaces of the white key 2*a* (protrusion portion 20) without being fitted into the fitting holes 24.

In contrast, the present embodiment has a constitution in which the first projections 61 are disposed on the virtual line Vc and the second projection 62 is formed in a manner of overlapping the first projections 61. Accordingly, when the attachment member 6 is elastically deformed so as to fit the second projections 62 and 63 into the fitting holes 25 and 26, the relative direction of the first projections 61 with respect to the fitting holes 24 is unlikely to change. Thus, when the attachment member 6 is inserted into the attachment hole 21 while being elastically deformed, since the first projections 61 are likely to be fitted into the fitting holes 24 without being caught by the side surfaces of the white key 2*a* (protrusion portion 20), workability of attachment work of the attachment member 6 can be improved.

In addition, the virtual line Vc is a straight line passing through the center C of the circular attachment member 6 in a side view. Namely, the second projections 62 and 63 protrude in directions opposite to each other with the center C of the attachment member 6 sandwiched therebetween. Thus, for example, in a constitution in which the first projections 61 are omitted and the second projection 62 is directly formed on the outer circumferential surface of the attachment member 6, the attachment member 6 including the second projections 62 and 63 has an external shape having rotational symmetry around the center C (axis in the scale direction). If the attachment member 6 has a shape having rotational symmetry, it is difficult for a worker to recognize which projection of the second projections 62 and 63 should be inserted into the fitting holes 25 and 26, that is, in which direction the attachment member 6 should be attached to the attachment hole 21.

In contrast, in the present embodiment, the attachment member 6 including each of the projections 61 to 63 has an external shape having no rotational symmetry around the center C (axis in the scale direction). That is, since the second projection 63 is directly formed on the outer circumferential surface of the attachment member 6 while the second projection 62 is formed in a manner of overlapping the first projections 61, it is possible to easily recognize in which direction the attachment member 6 should be attached to the attachment hole 21 by comparing the shape of the attachment member 6 (each of the projections 61 to 63) and the shape of the attachment hole 21 (each of the fitting holes 24 to 26).

In addition, the height of the second projection 62 from the outer circumferential surface of the attachment member 6 increases as much as the second projection 62 formed in a manner of overlapping the first projections 61. Thus, for example, as shown in FIG. 8B, in a state in which the attachment member 6 is inverted 180° around the center C from the state in FIG. 8A, even if the attachment member 6 is intended to be inserted into the attachment hole 21 while being elastically deformed to approximately the total protrusion dimension L1+L2 of the second projections 62 and 63 (to the extent shown in FIG. 8A), the second projection 62 is likely to be caught by the side surfaces of the white key 2*a* (protrusion portion 20). Thus, it is possible to curb a situation in which the attachment member 6 is inserted into the attachment hole 21 in a wrong direction.

On the other hand, for example, when the attachment member 6 is elastically deformed to approximately a dimension L1+L2+L3 which is the sum of the protrusion dimension L1+L2 of the second projections 62 and 63 and a protrusion dimension L3 of the first projections 61 (refer to FIG. 7B), that is, when the attachment member 6 is excessively elastically deformed, there is concern that the attachment member 6 may be inserted into the attachment hole 21 without having the second projection 62 caught by the side surfaces of the white key 2*a* (protrusion portion 20). Such excessive elastic deformation of the attachment member 6 is restricted by a partition wall 64 of the attachment member 6.

Specifically, the plate-shaped partition wall 64 protruding from the inner circumferential surfaces of the guide grooves 60 is formed in a substantially central part on the inner circumferential surfaces of the guide grooves 60 in the scale direction (arrow L-R direction). In other words, a pair of guide grooves 60 are formed on the side surfaces of the attachment member 6 on both sides in the scale direction with the partition wall 64 sandwiched therebetween, and the pair of guide grooves 60 are defined by the partition wall 64.

Since an opening 65 extending along the guide grooves 60 is formed in the partition wall 64, when the attachment member 6 is compressed such that the second projections 62 and 63 are recessed as described above (refer to FIG. 8A), elastic deformation of the attachment member 6 narrowing the groove widths of the guide grooves 60 can be tolerated.

An opening width L4 of the opening 65 in a direction along the virtual line Vc (refer to FIG. 7B) is formed to be larger than the total protrusion dimension L1+L2 of the second projections 62 and 63 (L4>L1+L2). The opening width L4 of this opening 65 allows the attachment member 6 to be attached to the attachment hole 21 in a proper posture (the state in FIG. 8A).

Meanwhile, the opening width L4 of the opening 65 is formed to be smaller than the total protrusion dimension L1+L2+L3 of the first projections 61 and the second projections 62 and 63 (L4<L1+L2+L3). Accordingly, even if the attachment member 6 is intended to be inserted into the attachment hole 21 in a state of being inverted 180° around the center C (the state in FIG. 8B), excessive elastic deformation of the attachment member 6 allowing the second projection 62 to be inserted into the fitting hole 26 can be restricted due to contact between the edges of the opening 65 (partition wall 64). Thus, it is possible to curb a situation in which the attachment member 6 is attached to the attachment hole 21 in a wrong posture.

Here, as described above, the starting point P1 (refer to the enlarged part in FIG. 2) and the ending point P2 (refer to the enlarged part in FIG. 3) of the guide grooves 60 of the white key 2*a* are positioned on the virtual circle Vb about the virtual axis Va, but the position of the virtual axis Va is set to different positions for the key 2 on a low tone side and the key 2 on a high tone side. This constitution will be described with reference to FIGS. 9A to 9C.

Figure 9A:
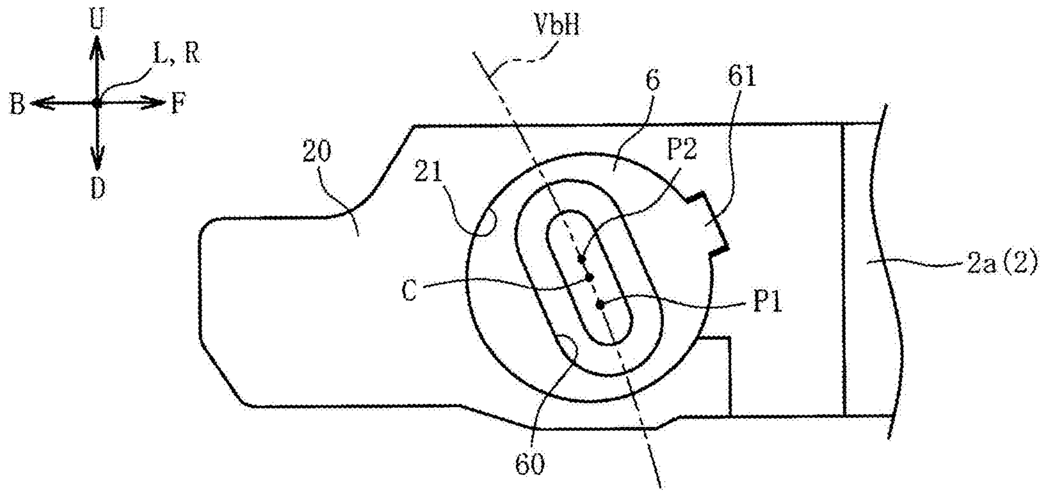
FIG. 9A is a side view of the white key positioned on the highest tone side.
Figure 9B:
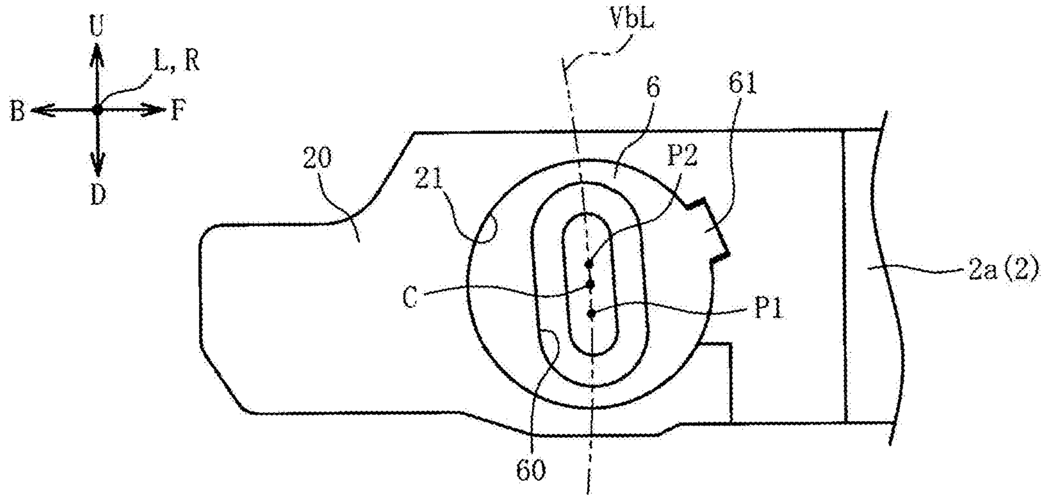
FIG. 9B is a side view of the white key positioned on the lowest tone side.
Figure 9C:
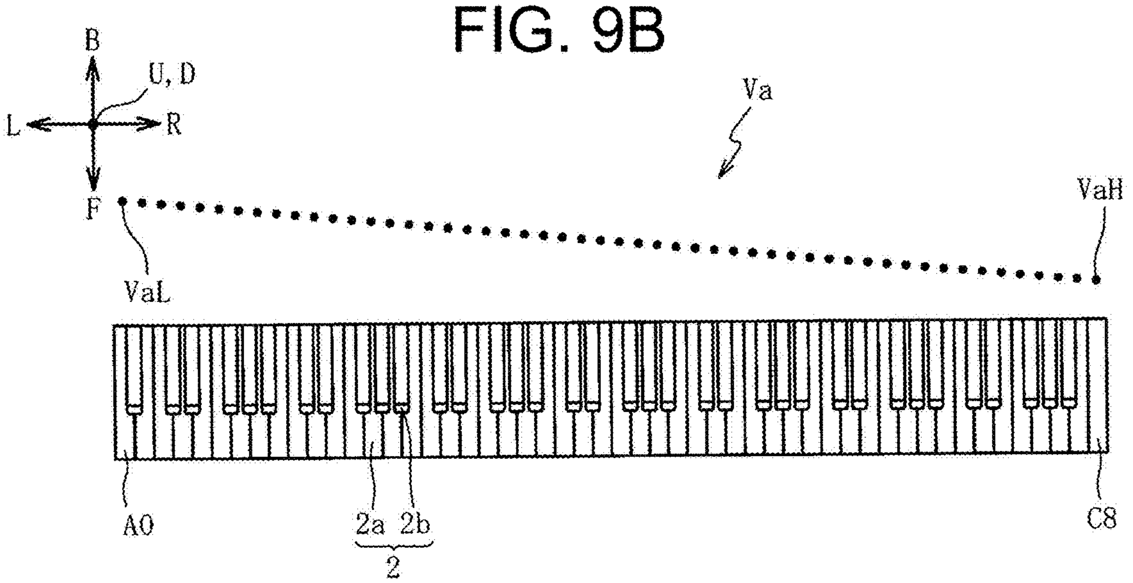
FIG. 9C is a top view of keys schematically showing positions of virtual axes of the respective white keys.

FIG. 9A is a side view of the white key 2*a* positioned on the highest tone side, FIG. 9B is a side view of the white key 2*a* positioned on the lowest tone side, and FIG. 9C is a top view of the keys 2 schematically showing the positions of the virtual axes Va of the respective white keys 2*a*.

As shown in FIGS. 9A and 9C, for the white key 2*a* with a pitch name C8 positioned on the highest tone side, the starting point P1 and the ending point P2 of the guide grooves 60 are formed around a virtual circle VbH about a virtual axis VaH at a relatively close distance from the white key 2*a*.

Meanwhile, as shown in FIGS. 9B and 9C, for the white key 2*a* with a pitch name A0 positioned on the lowest tone side, the starting point P1 and the ending point P2 of the guide grooves 60 are formed around a virtual circle VbL about a virtual axis VaL at a farther distance from the white key 2*a* than the white key 2*a* with the pitch name C8.

Further, as shown in FIG. 9C, the virtual axes Va of the respective white keys 2*a* arranged in the scale direction are set at different positions for each of the white keys 2*a*. That is, since the angles of the guide grooves 60 of each of the keys 2 differ among the white keys 2*a* and among the black keys 2*b*, each of these keys 2 can swing in a different displacement trajectory without changing the dimension of each of the white keys 2*a* and the black keys 2*b* in the forward-rearward direction. Thus, unlike the structure by the technology in the related art (for example, Japanese Patent Laid-Open No. 2015-034853) in which the displacement trajectory of each key is changed by changing the overall length of each key, since lengthening the overall lengths of some of the keys 2 can be made unnecessary, it is possible to curb increase in size of the keyboard device 1.

In addition, in the present embodiment, the positions of the virtual axes Va of the respective white keys 2*a* arranged in the scale direction become gradually (proportionally) close to the white keys 2*a* from the low tone side to the high tone side of the white keys 2*a*. That is, the angles of the guide grooves 60 with respect to the vertical direction gradually increase from the low tone side to the high tone side of the white keys 2*a*. Accordingly, each of the white keys 2*a* can swing in a displacement trajectory close to that of an acoustic grand piano.

In this manner, it is possible to employ a constitution in which the guide grooves 60 are set at different angles among the white keys 2*a* and among the black keys 2*b* even when the guide grooves 60 are formed integrally with the white key 2*a*, for example. However, in a constitution in which the angles of the guide grooves 60 formed integrally with the white key 2*a* are changed, the mold for molding each of the white keys 2*a* becomes complicated, and therefore manufacturing costs of the white key 2*a* increase.

In contrast, the present embodiment has a structure in which the attachment member 6 having the guide grooves 60 formed on the side surfaces is attached to the white key 2*a* (protrusion portion 20). Accordingly, since the mold for molding the white key 2*a* can be simplified compared to when the angles of the guide grooves 60 formed integrally with the white key 2*a* are changed as described above, manufacturing costs of the white key 2*a* can be reduced.

In addition, since the attachment member 6 having a common external shape (each of the projections 61 to 63) is attached to each of the white keys 2*a*, the attachment hole 21 can also adopt a common shape in each of the white keys 2*a*. Accordingly, since the number of kinds of molds for molding the respective white keys 2*a* can be reduced, manufacturing costs of the white key 2*a* can be reduced.

The attachment member attached to each of the black keys 2*b* may have the same external shape as the attachment member 6 attached to the white key 2*a* or may have a different external shape. In any of the cases, it is preferable that an attachment member having a common external shape be attached to each of the black keys 2*b* except for the shapes (angles) of the guide grooves. Accordingly, since the attachment hole for attaching the attachment member can have a common shape in each of the black keys 2*b*, the number of kinds of molds for molding the respective black keys 2*b* can be reduced.

As described above, the attachment member 6 including the first projections 61 has an external shape having no rotational symmetry about the center C of the attachment member 6. Accordingly, it is possible to curb a situation in which the attachment member 6 is attached to the attachment hole 21 in a wrong direction (angle), and therefore the angles of the guide grooves 60 in each of the white keys 2*a* can be reliably set to target angles.

Here, when the virtual axis Va is set at different positions for the white key 2*a* on the low tone side and the white key 2*a* on the high tone side, there is a difference in stroke amount of the front end portion of each of the white keys 2*a*. This difference in stroke amount will be described with reference to FIGS. 2 and 9.

As shown in FIG. 2, in the white key 2*a*, swinging of a part on the front end side (arrow F side) of the guide grooves 60 is guided by rotation around the rotation axis 43 of the hammer 7 as described above. In addition, the ending edge position of this swinging is determined due to contact between the hammer 7 and a stopper 48. The stopper 48 is a cushioning material made of felt or urethane foam fixed to the chassis 4 on the upward side of the mass portion 70 of the hammer 7.

The position of the rotation axis 43 of the hammer 7 and the engagement position between the hammer 7 and the white key 2*a* (the lower end of the projection portion 22) are the same in each of the white keys 2*a* arranged in the scale direction (for example, the rotation axes 43 of the respective hammers 7 are arranged in the scale direction). Thus, when the rotation angle of the hammer 7 to the part where it comes into contact with the stopper 48 is uniform in each of the white keys 2*a*, the stroke amount of the white key 2*a* (the lower end of the projection portion 22) at the engagement position with respect to the hammer 7 is the same in each of the white keys 2*a*.

Meanwhile, as described above, swinging of the rear end portion of each of the white keys 2*a* is guided by the guide grooves 60. As shown in FIG. 9B, in the white key 2*a* on the low tone side, the angles of the guide grooves 60 with respect to the vertical direction are relatively small (the virtual axis Va is relatively far), and as shown in FIG. 9C, in the white key 2*a* on the high tone side, the angles of the guide grooves 60 with respect to the vertical direction are relatively large (the virtual axis Va is relatively close).

Thus, when the rotation angle of the hammer 7 to the part where it comes into contact with the stopper 48 shown in FIG. 2 is uniform in each of the white keys 2*a*, the stroke amount of the rear end portion of each of the white keys 2*a* (sliding amounts of the guide grooves 60 with respect to the shaft portions 41) from the initial position before key pressing to the ending edge position of key pressing becomes smaller in the white key 2*a* on the high tone side than in the white key 2*a* on the low tone side. If the stroke amount of the rear end portion of the white key 2*a* is relatively small, the stroke amount of the front end portion of the white key 2*a* (a part on a side in front of the engagement position with respect to the hammer 7) increases (the angle of the white key 2*a* at the ending edge position of key pressing is inclined relatively significantly with respect to the horizontal direction).

That is, when the rotation angle of the hammer 7 to the ending edge position of key pressing is uniformly set in each of the white keys 2*a* and the distance to the virtual axis Va is set to be closer in the white key 2*a* on the high tone side than on the low tone side, the stroke amount of the front end portion of the white key 2*a* on the high tone side becomes larger than that of the white key 2*a* on the low tone side. If there is a difference in stroke amount of the front end portion of each of the white keys 2*a*, it is not possible to give a favorable feeling of playing to a player.

Figure 10:
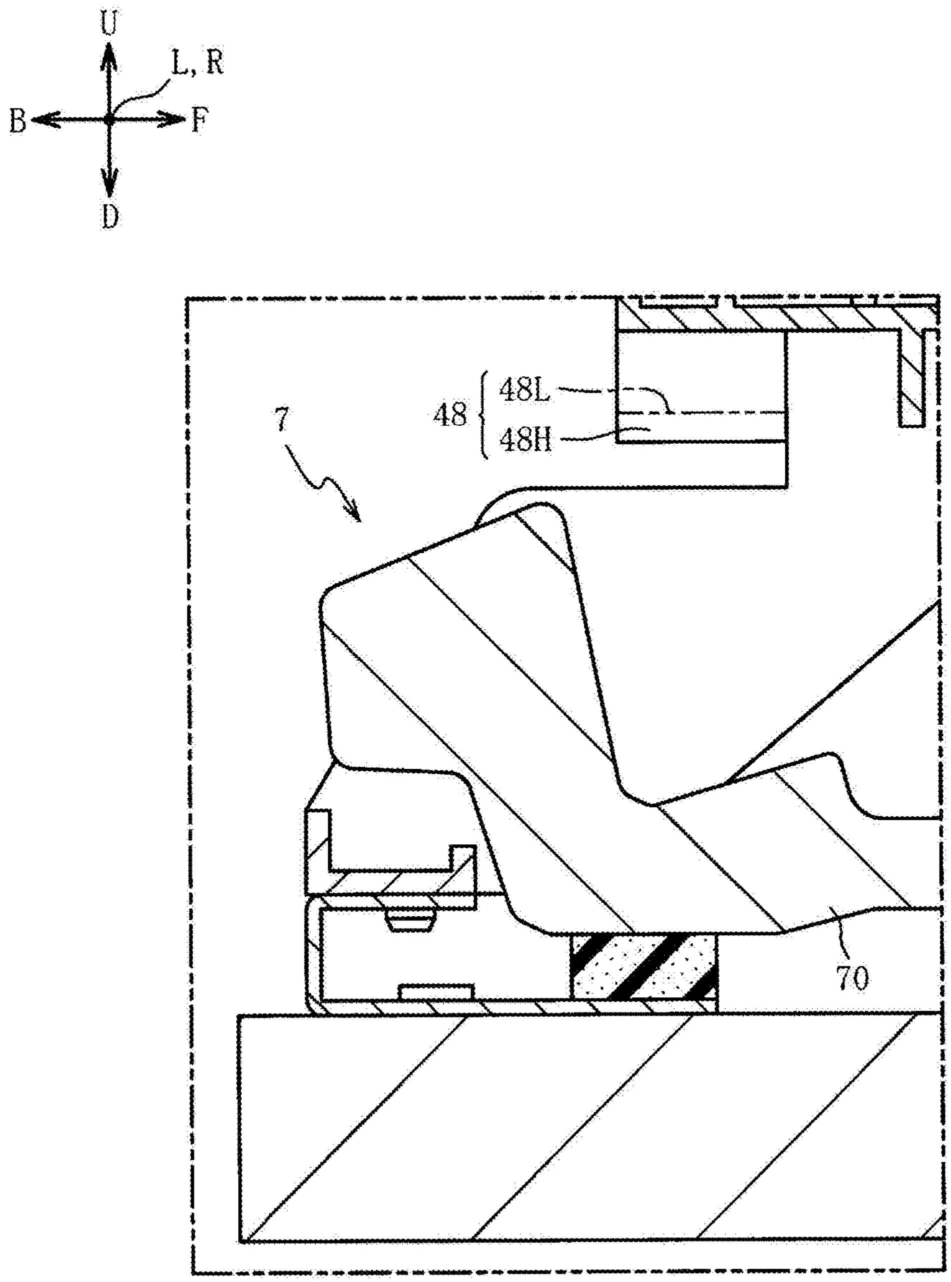
FIG. 10 is a partial enlarged cross-sectional view of a keyboard device 1 at a position corresponding to the X part in FIG. 2.

A constitution for resolving this problem will be described with reference to FIG. 10. FIG. 10 is a partial enlarged cross-sectional view of the keyboard device 1 at a position corresponding to the X part in FIG. 2. FIG. 10 illustrates a cross section including a stopper 48H positioned on the highest tone side (corresponding to the white key 2*a* with the pitch name C8). However, in order to simplify the drawings, hatching of the stopper 48H is omitted.

As shown in FIG. 10, in the stoppers 48, a stopper positioned on the lowest tone side (corresponding to the white key 2*a* with the pitch name A0) will be regarded as a stopper 48L, and a stopper positioned on the highest tone side (corresponding to the white key 2*a* with the pitch name C8) will be regarded as the stopper 48H. The thickness of the stopper 48H is formed to be larger than the thickness of the stopper 48L. Further, although illustration is omitted, the stoppers 48 are formed to have a thickness gradually (proportionally) increasing from the stopper 48L of the white key 2*a* on the lowest tone side to the stopper 48H of the white key 2*a* on the highest tone side.

Namely, the spacing between the mass portion 70 (a part which comes into contact with the stopper 48 when the white key 2*a* is pressed) of the hammer 7 in the rotation direction and the stopper 48 gradually narrows from the white key 2*a* on the low tone side to the white key 2*a* on the high tone side. Accordingly, the rotation angle of the hammer 7 to the part where it comes into contact with the stopper 48 when the white key 2*a* is pressed can be made smaller in the white key 2*a* on the high tone side than in the white key 2*a* on the low tone side. Thus, as described above, even when the distance to the virtual axis Va is set to be closer in the white key 2*a* on the high tone side than in the white key 2*a* on the low tone side, the stroke amount of the front end portion of each of the white keys 2*a* can be made uniform. Thus, it is possible to give a favorable feeling of playing to a player.

In the present embodiment, the stroke amount of the front end portion of each of the white keys 2*a* is made uniform by changing the thickness of the stopper 48, but the embodiment is not necessarily limited to this. For example, a constitution in which the thickness of the mass portion 70 of the hammer 7 in the upward-downward direction gradually (proportionally) increases from the low tone side to the high tone side while the stopper 48 of each of the white keys 2*a* has the same thickness in each of the white keys 2*a* may be adopted. In this constitution as well, the spacing between the mass portion 70 of the hammer 7 in the rotation direction and the stopper 48 can be formed to gradually narrow from the white key 2*a* on the low tone side to the white key 2*a* on the high tone side.

Figure 11A:
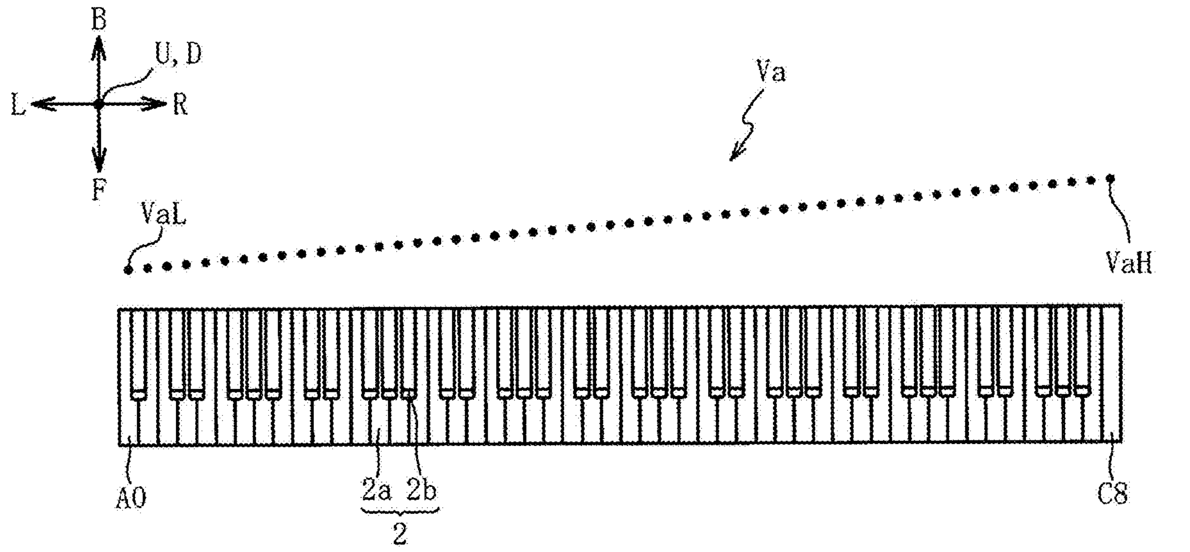
FIG. 11A is a top view of the keys schematically showing the positions of the virtual axes according to the first modification example.

Next, with reference to FIGS. 11A to 11C, a modification example of disposition of the virtual axes Va will be described. FIG. 11A is a top view of the keys 2 schematically showing the positions of the virtual axes Va according to the first modification example, FIG. 11B is a top view of the keys 2 schematically showing the positions of the virtual axes Va according to the second modification example, and FIG. 11C is a top view of the keys 2 schematically showing the positions of the virtual axes Va according to the third modification example.

As shown in FIG. 11A, in the first modification example of the virtual axes Va, the virtual axis VaH of the white key 2*a* on the highest tone side (pitch name C8) is set at a position farther from the white key 2*a* than the virtual axis VaL of the white key 2*a* on the lowest tone side (pitch name A0). Further, the virtual axes Va are provided to become gradually (proportionally) distant from the white keys 2*a* from the low tone side to the high tone side of the white keys 2*a*. Accordingly, the displacement trajectories of the white keys 2*a* can be gradually changed from the white key 2*a* on the low tone side to the white key 2*a* on the high tone side. Such a distance from the white key 2*a* to the virtual axis Va can be adjusted by changing the angles of the guide grooves 60 (refer to FIGS. 9A to 9C) as described above. The same also applies to other modification examples below.

Figure 11B:
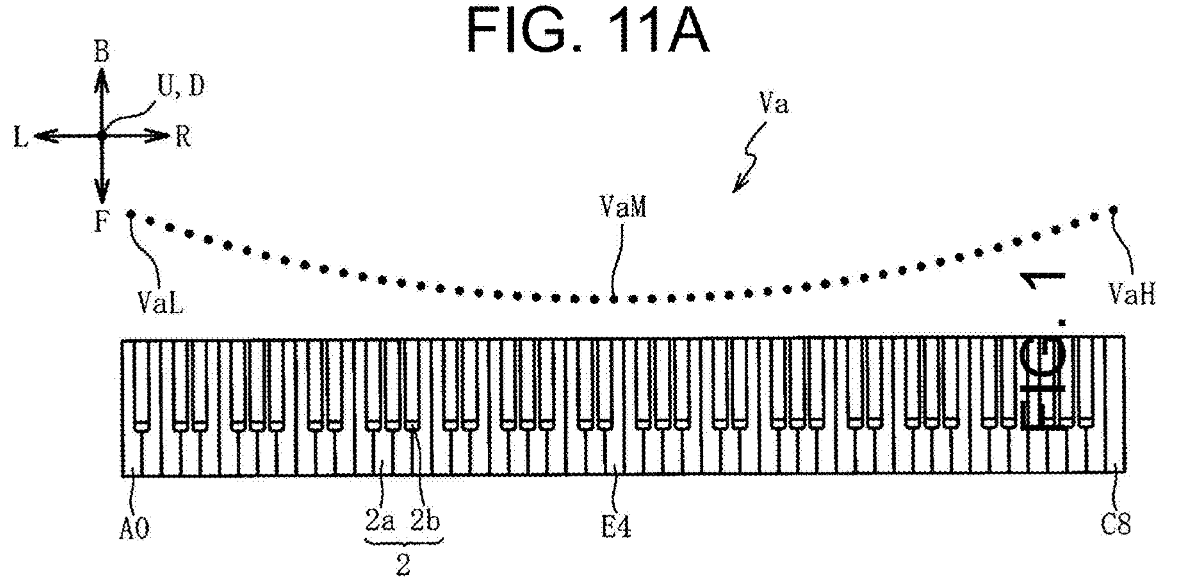
FIG. 11B is a top view of the keys schematically showing the positions of the virtual axes according to the second modification example.
Figure 11C:
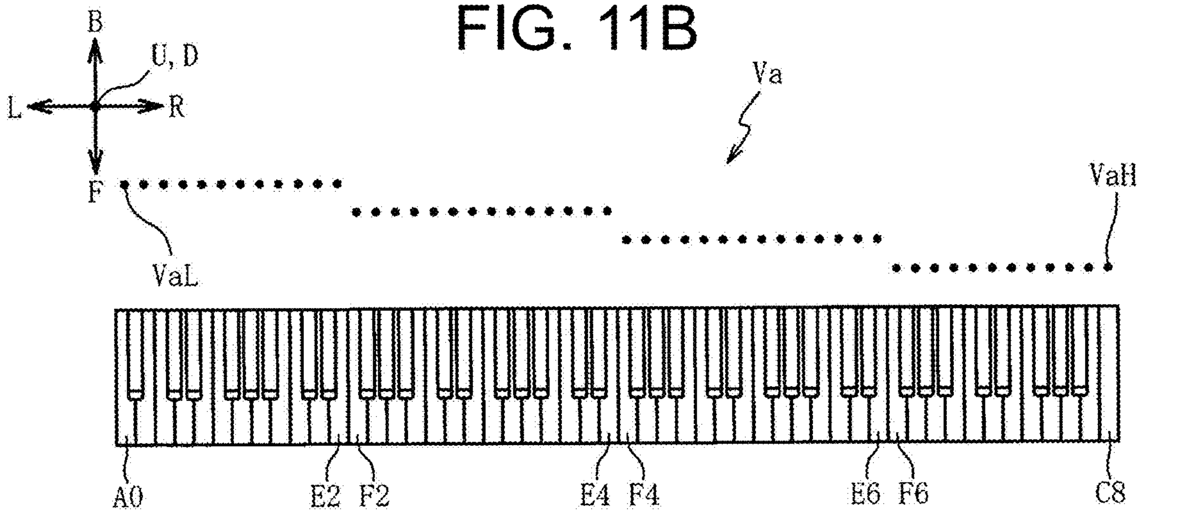
FIG. 11C is a top view of the keys schematically showing the positions of the virtual axes according to the third modification example.

As shown in FIG. 11B, in the second modification example of the virtual axes Va, the distance from the white key 2*a* is the same in the virtual axis VaL of the white key 2*a* on the lowest tone side and the virtual axis VaH of the white key 2*a* on the highest tone side. Meanwhile, a virtual axis VaM of the white key 2*a* in a middle register (for example, the pitch name E4) is set at a position closer to the white key 2*a* than the virtual axes VaL and VaH. Further, the virtual axes Va are provided to become gradually (quadratically) close to the white keys 2*a* from the white keys 2*a* on the low tone side and the high tone side to the white key 2*a* in the middle register.

Accordingly, the displacement trajectories of the white keys 2*a* can be gradually changed from the white keys 2*a* on the low tone side and the high tone side to the white key 2*a* in the middle register.

As shown in FIG. 11C, in the third modification example of the virtual axes Va, the virtual axes Va are provided to become gradually (in stages) close to the white keys 2*a* from the virtual axis VaL of the white key 2*a* on the lowest tone side to the virtual axis VaH of the white key 2*a* on the highest tone side.

More specifically, the registers of the white keys 2*a* are divided (equally divided) into four registers. Compared to the white keys 2*a* in the registers on the lowest tone side (for example, the pitch names A0 to E2), in the white keys 2*a* on the middle register side (for example, the pitch names F2 to E4) therefrom, the virtual axis Va is set at a closer position. Meanwhile, the white keys 2*a* forming the same division region (for example, the pitch names A0 to E2) have the same distance to the virtual axis Va.

Similar to this, compared to the white keys 2*a* in the middle register on a relatively high tone side (for example, the pitch names F4 to E6), in the white keys 2*a* in the register on the highest tone side (for example, the pitch names F6 to C8), the virtual axis Va is set at a closer position. However, the white keys 2*a* forming the same division region (for example, the pitch names F4 to E6) have the same distance to the virtual axis Va.

In this manner, by setting the virtual axis Va to be gradually close from the low tone side to the high tone side of the white keys 2*a*, similar to the foregoing embodiment (refer to FIG. 9C), each of the white keys 2*a* can swing in a displacement trajectory close to that of an acoustic grand piano. Moreover, since the positions of the virtual axes Va are close to the white keys 2*a* in stages from the low tone side to the high tone side, the angles of the guide grooves 60 with respect to the vertical direction can also be similarly increased in stages from the low tone side to the high tone side of the white keys 2*a*. Accordingly, since the same angles of the guide grooves 60 may be set to the white keys 2*a* having the same position of the virtual axis Va (for example, the pitch names A0 to E2), the common attachment member 6 can be attached to each of the white keys 2*a*. Accordingly, since the number of kinds of the attachment member 6 to be used can be reduced, manufacturing costs of the attachment member 6 can be reduced.

Figure 12A:
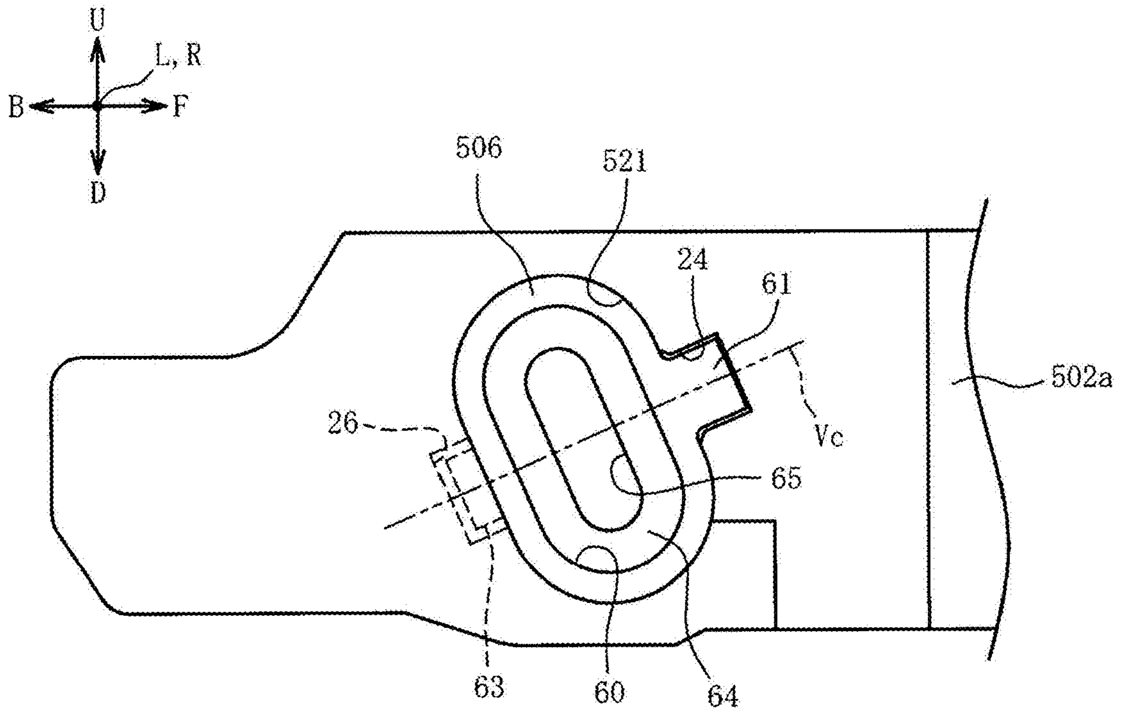
FIG. 12A is a side view of a white key of a fourth modification example.

Next, with reference to FIGS. 12A and 12B, a white key 502*a* of a fourth modification example will be described. The same reference signs are applied to parts which are the same as those in the foregoing embodiment, and description thereof will be omitted. FIG. 12A is a side view of the white key 502*a* of the fourth modification example, and FIG. 12B is a perspective view of the white key 502*a* showing a state in which an attachment member 506 is detached from an attachment hole 521.

Figure 12B:
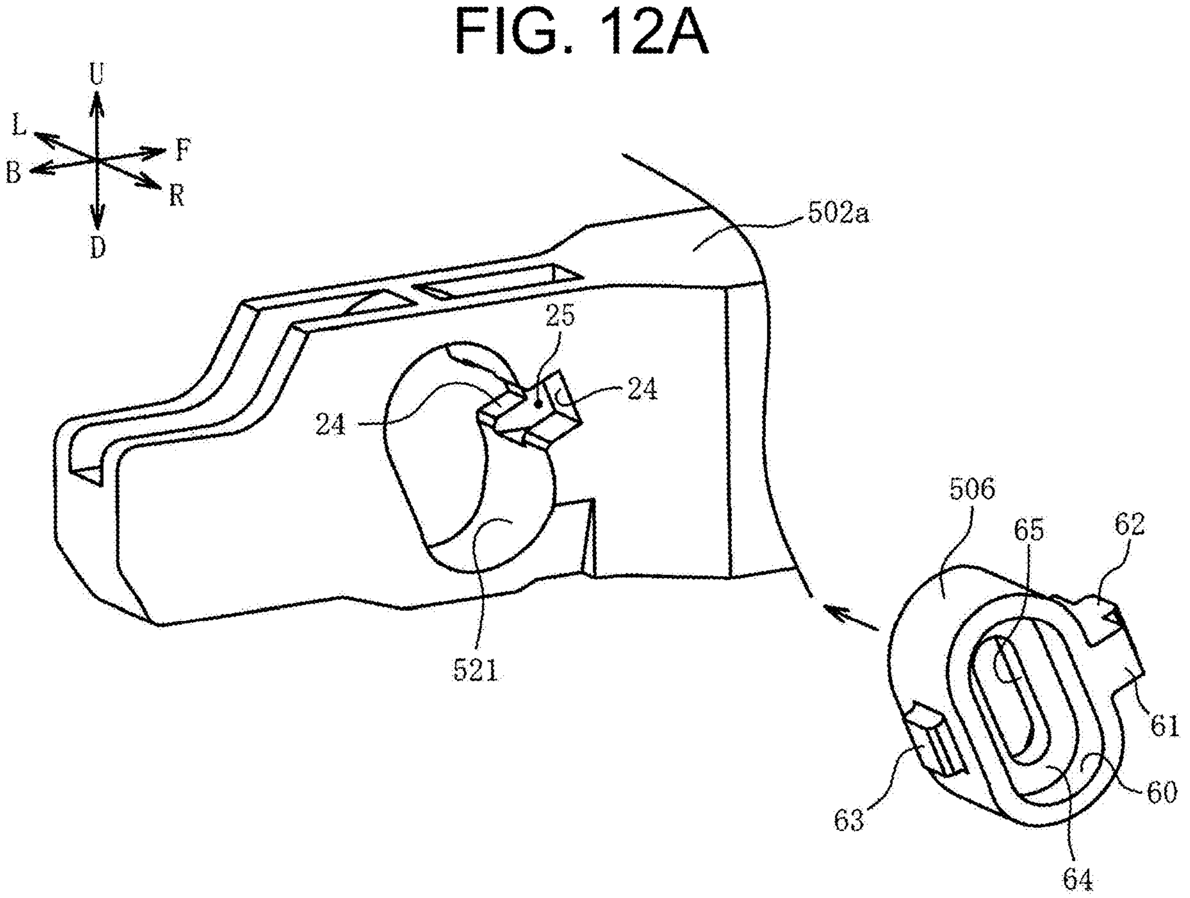
FIG. 12B is a perspective view of the white key showing a state in which an attachment member is detached through an attachment hole.

As shown in FIGS. 12A and 12B, the white key 502*a* of the fourth modification example has the same constitution as the white key 2*a* described in the foregoing embodiment (refer to FIGS. 9A to 9C) except that the inner circumferential surface of the attachment hole 521 has an oval shape. That is, the fitting holes 24 to 26 similar to that of the white key 2*a* are formed in the attachment hole 521 of the white key 502*a*.

The attachment member 506 attached to the attachment hole 521 has the same constitution as the attachment member 6 described in the foregoing embodiment except that it has an oval external shape (a shape corresponding to the attachment hole 521) along the shapes of the guide grooves 60. That is, the first projections 61, the second projections 62 and 63, and the partition wall 64 (opening 65) are formed in the attachment member 506.

Since the attachment member 506 is formed using a soft material having a lower hardness than a resin which is a material of the white key 502*a*, it is possible to curb occurrence of noise at the time of sliding in the guide grooves 60 along the shaft portions 41 (refer to FIG. 3).

Here, in the foregoing embodiment, cases in which the angles of the guide grooves 60 are set to different angles for each of the white keys 2*a* (or each of the black keys 2*b*) have been described. However, in the modification example shown in FIGS. 12A and 12B, the angles of the guide grooves 60 are set to the same angle for all the white keys 502*a* arranged in the scale direction. Namely, the attachment hole 521 having a common shape is formed in each of the white keys 502*a*, and the common attachment member 506 is attached to the attachment hole 521 thereof.

Further, when a straight line connecting the centers of the second projections 62 and 63 to each other in a direction around the outer circumferential surface of the attachment member 506 is the virtual line Vc, the attachment member 506 has a line-symmetrical external shape having the virtual line Vc as an axis of symmetry in a side view. In addition, the guide grooves 60 also have a line-symmetrical shape having the virtual line Vc as an axis of symmetry in a side view. Namely, the attachment member 506 has a shape of rotational symmetry (two-fold symmetry) about the virtual line Vc and can be attached to the attachment hole 521 even if the front and the rear of the attachment member 506 are inverted 180° around the virtual line Vc. Accordingly, the attachment member 506 can be attached without considering the front and the rear around the virtual line Vc with respect to all the white keys 502*a* arranged in the scale direction. Thus, workability of attachment work of the attachment member 506 can be improved.

Such a shape of rotational symmetry (two-fold symmetry) having the virtual line Vc as a an axis of symmetry may be applied to each of the attachment members 6 of the foregoing embodiment (refer to FIGS. 9A and 9B). In this case, the shape of the attachment hole 21 (the position of each of the fitting holes 24 to 26), that is, the angles of the guide grooves 60 (the positions of the virtual axes Va) can also be similarly changed by gradually changing the attachment angle of the attachment member 6 from the low tone side to the high tone side of the white keys 2*a*.

Figure 13A:
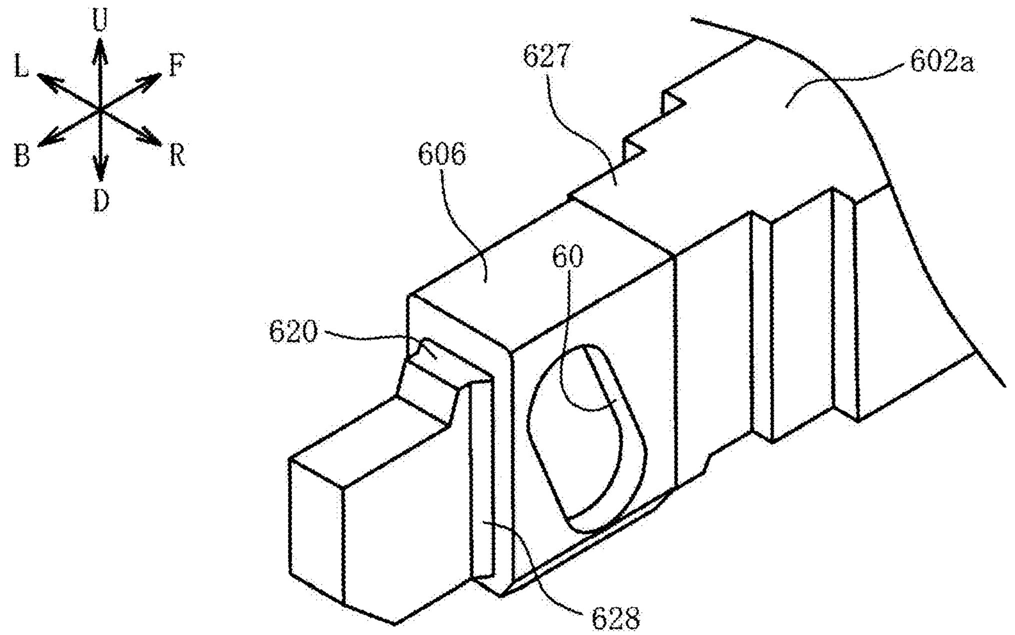
FIG. 13A is a perspective view of a white key of a fifth modification example.

Next, with reference to FIGS. 13A and 13B, the white key 602*a* of the fifth modification example will be described. FIG. 13A is a perspective view of the white key 602*a* of the fifth modification example, and FIG. 13B is a perspective view of the white key 602*a* showing a state in which the attachment member 606 is detached from the protrusion portion 620.

Figure 13B:
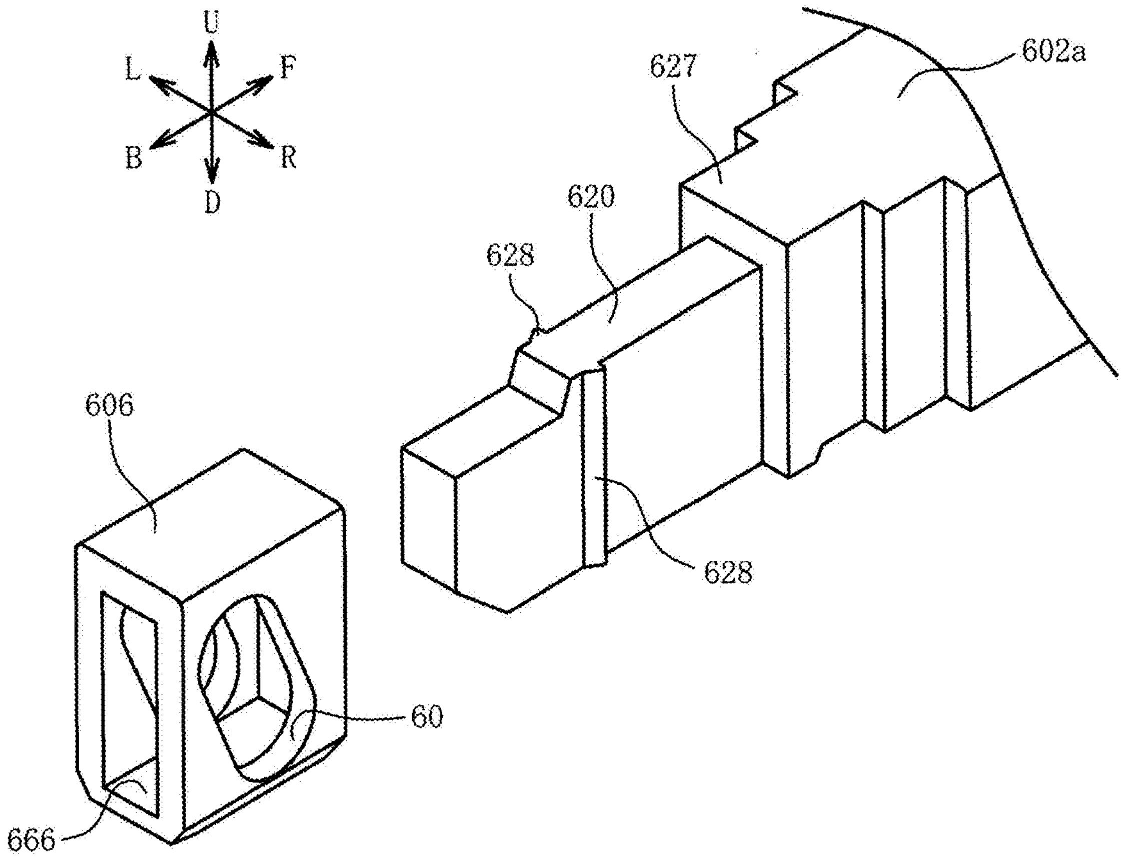
FIG. 13B is a perspective view of the white key showing a state in which an attachment member is detached from a protrusion portion.

As shown in FIGS. 13A and 13B, the protrusion portion 620 of the white key 602*a* of the fifth modification example is formed to have a plate shape (rectangular parallelepiped shape) extending in the forward-rearward direction (arrow F-B direction), and the attachment member 606 is attached to this protrusion portion 620. The attachment member 606 is formed to have an angular tube shape having an insertion hole 666 extending in the forward-rearward direction, and the guide grooves 60 penetrate the side surfaces of the attachment member 606 in the scale direction (arrow L-R direction).

The dimensions of the protrusion portion 620 in each of the upward-downward direction and the scale direction are formed to be the same as (or slightly smaller than) the dimensions of the insertion hole 666 in the same directions, and the attachment member 606 is attached to the white key 602*a* when the protrusion portion 620 is inserted into the insertion hole 666 of the attachment member 606. Accordingly, since formation of a hole for attaching the attachment member 606 in the protrusion portion 620 can be made unnecessary, the rigidity of the protrusion portion 620 can be ensured.

Since the attachment member 606 is formed using a soft material having a lower hardness than a resin which is a material of the white key 602*a*, it is possible to curb occurrence of noise at the time of sliding in the guide grooves 60 along the shaft portions 41 (refer to FIG. 3).

A first restriction portion 627 and the second restriction portions 628 for restricting displacement of the attachment member 606 to the front and the rear mounted in the protrusion portion 620 are formed in the white key 602*a*. The first restriction portion 627 is a part of which the dimensions in the scale direction and the upward-downward direction are formed to be larger than those of the protrusion portion 620. Since the protrusion portion 620 protrudes to the rear side from the rear surface of this first restriction portion 627, displacement of the attachment member 606 to the front side is restricted by the first restriction portion 627 in a state in which the attachment member 606 is mounted in the protrusion portion 620.

Meanwhile, the second restriction portions 628 are formed on the rear end side of the protrusion portion 620. The second restriction portions 628 are vertically extending projections and protrude from the side surfaces of the protrusion portion 620 on both sides in the scale direction. The rear surfaces of the second restriction portions 628 are inclined surfaces inclined to the front side as they go toward the outer side in the scale direction. Thus, when the protrusion portion 620 is inserted into the insertion hole 666 of the attachment member 606, the attachment member 606 surmounts the second restriction portions 628 while the attachment member 606 (insertion hole 666) opens wide along the inclined rear surfaces of the second restriction portions 628, and therefore the attachment member 606 is attached to the protrusion portion 620.

The dimension from the rear surface of the first restriction portion 627 to the second restriction portions 628 is substantially the same as that of the attachment member 606 in the forward-rearward direction, and the attachment member 606 is sandwiched between the restriction portions 627 and 628, and therefore displacement of the attachment member 606 to the front and the rear is restricted. Accordingly, while making it unnecessary to adhere the attachment member 606 to the white key 602*a*, it is possible to curb a situation in which the attachment member 606 falls off from the protrusion portion 620.

Hereinabove, description has been given based on the foregoing embodiment. However, the disclosure is not limited by the foregoing embodiment in any way, and it can be easily inferred that various improvements and modifications can be made within a range not departing from the gist of the disclosure.

In the foregoing embodiment, cases in which the attachment member 6, 506, or 606 having the guide grooves 60 is attached to the white key 2*a*, 202*a*, 302*a*, 402*a*, 502*a*, or 602*a* have been described, but the embodiment is not necessarily limited to these. For example, the guide grooves 60 may be formed integrally with the white key 2*a*, 202*a*, 302*a*, 402*a*, 502*a*, or 602*a*.

In the foregoing embodiment, cases in which the guide grooves 60 of the attachment member 6, 506, or 606 attached to the white key 2*a*, 202*a*, 302*a*, 402*a*, 502*a*, or 602*a* are slidably engaged with the shaft portions 41 of the chassis 4 have been described, but the embodiment is not necessarily limited to these. For example, the guide grooves 60 may be formed in the chassis 4, and a guide shaft which can slide in the guide grooves 60 may be formed in the white key 2*a*, 202*a*, 302*a*, 402*a*, 502*a*, or 602*a*. In the case of such a constitution, an attachment hole capable of attaching a member corresponding to the attachment member 6, 506, or 606 may be formed on the chassis 4 (wall portions 40) side, and the guide grooves 60 may be directly formed in the wall portions 40.

In the foregoing embodiment, cases in which gaps are respectively formed between the inclined surfaces 20*c*1 or 420*h*1 and the curved surfaces 20*c*2 or 420*h*2 of the guided surfaces 20*c* or 420*h* and the guide surfaces 46*c* or 447*a* have been described, but the embodiment is not necessarily limited to these. For example, the entire inclined surfaces 20*c*1 or 420*h*1 (or parts thereof on the upper end sides) may be formed parallel to the guide surfaces 46*c* or 447*a* and brought into surface contact therewith, and gaps may be formed only between the curved surfaces 20*c*2 or 420*h*2 and the guide surfaces 46*c* or 447*a*. In addition, the curved surfaces 20*c*2 or 420*h*2 may be omitted, and the guided surfaces 20*c* or 420*h* may be formed from only the inclined surfaces 20*c*1 or 420*h*1. That is, if gaps are formed between the guided surfaces 20*c* or 420*h* and the guide surfaces 46*c* or 447*a* in a region including at least the lower ends of the guided surfaces 20*c* or 420*h*, it is possible to curb a situation in which the grease is scraped off.

In the foregoing embodiment, cases in which the attachment member 6, 506, or 606 (guide grooves 60) is formed using a material having a lower hardness than that of the white key 2*a* have been described, but the embodiment is not necessarily limited to these. For example, the shaft portions 41 of the chassis 4 (guide shaft) may be formed using a material having a lower hardness than that of the white key 2*a*. In this case, the attachment member 6, 506, or 606 (guide grooves 60) may also be similarly formed using a material having a lower hardness than that of the white key 2*a*, and the hardness of the attachment member 6, 506, or 606 (guide grooves 60) may be the same as that (or higher than that) of the white key 2*a*. In addition, the attachment member 6, 506, or 606 (guide grooves 60) and the shaft portions 41 (guide shaft) may have the same hardness, or either one may have a higher hardness than the other.

In the foregoing embodiment, cases in which the attachment member 6 or 506 has a circular or oval external shape have been described. However, the external shape of the attachment member 6 or 506 may be a polygonal shape or may be a combined shape of a circular shape and a polygonal shape. That is, as long as the guide grooves 60 are included, the shape of the attachment member 6 or 506 can be suitably set.

In the foregoing embodiment, cases in which the attachment member 6 or 506 is attached to the attachment hole 21 or 521 respectively through fitting between the projections 61 to 63 of the attachment member 6 or 506 and the fitting holes 24 to 26 of the attachment hole 21 or 521 have been described, but the embodiment is not necessarily limited to these. For example, any one of or all the projections 61 to 63 (fitting holes 24 to 26) may be omitted, and the attachment member 6 or 506 may be adhered to the attachment hole 21 or 521. In addition, projecting portions corresponding to the respective projections 61 to 63 may be provided on the attachment hole 21 or 521 side. Meanwhile, recessed portions corresponding to the fitting holes 24 to 26 may be provided in the attachment member 6 or 506.

In the foregoing embodiment, cases in which change in attachment angle of the attachment member 6 with respect to the attachment hole 21 is restricted through fitting between the fitting holes 24 and the first projections 61 have been described, but the embodiment is not necessarily limited to these. For example, the fitting holes 24 and the first projections 61 may be omitted, and change in attachment angle of the attachment member 6 may be restricted through fitting between any one of or both the second projections 62 and 63 and the fitting holes 25 and 26. In this case, the dimensions of the fitting holes 25 and 26 in the circumferential direction of the attachment hole 21 may be formed to be the same as (or slightly larger than) the dimensions of the second projections 62 and 63 in the same direction.

In the foregoing embodiment, cases in which the virtual line Vc connecting the second projections 62 and 63 (first projections 61) to each other and the guide grooves 60 intersect in a side view and cases in which the first projections 61 are formed on the virtual line Ve have been described, but the embodiment is not necessarily limited to these. For example, a constitution in which the virtual line Vc and the guide grooves 60 do not intersect may be adopted, and the first projections 61 may be formed at a position not overlapping the virtual line Vc. That is, a formation position of each of the projections 61 to 63 on the outer circumferential surface of the attachment member 6 or 506 can be suitably set.

In the foregoing embodiment, cases in which the fitting holes 24 are formed along the edges of the attachment hole 21 on the opening sides (outer sides in the scale direction) have been described, but the embodiment is not necessarily limited to these. For example, walls may be formed at the edges of the fitting holes 24 on the outer sides in the scale direction, and falling off of the attachment member 6 may be restricted due to these walls catching the first projections 61. In this case, the second projections 62 and 63 (fitting holes 25 and 26) may be omitted.

In the foregoing embodiment, cases in which the guide grooves 60 are formed in a linear shape from the starting point P1 to the ending point P2 have been described. However, the guide grooves 60 may be formed in an arc shape from the starting point P1 to the ending point P2.

In the foregoing embodiment, cases in which the outer circumferential surfaces of the shaft portions 41 come into contact with only the sliding surfaces of the guide grooves 60 at each of the initial position before key pressing and the ending edge position of key pressing have been described, but the embodiment is not necessarily limited to these. For example, the outer circumferential surfaces of the shaft portions 41 may come into contact with the inner circumferential surfaces of the guide grooves 60 on the lower end side or the upper end side at any one of or both the initial position before key pressing or the ending edge position of key pressing.

In the foregoing embodiment, cases in which the opening 65 is formed in the partition wall 64 defining the guide grooves 60 have been described. However, the partition wall 64 or the opening 65 may be omitted. In addition, cases in which the opening width L4 of the opening 65 is formed to be smaller than the total protrusion dimension L1+L2+L3 of the first projections 61 and the second projections 62 and 63 have been described. However, the opening width L4 of the opening 65 may be formed to be the same as that (or smaller than that) of the total protrusion dimension L1+L2+L3 of the first projections 61 and the second projections 62 and 63 (need only be larger than at least the protrusion dimension L1+L2 of the second projections 62 and 63).

In the foregoing embodiment, cases in which the attachment member 506 has a line-symmetrical external shape (shapes of the guide grooves 60) having the virtual line Vc as a axis of symmetry in a side view have been described. However, the attachment member 506 may have an asymmetrical external shape (shapes of the guide grooves 60) about the virtual line Vc.

In the foregoing embodiment, cases in which the spacing between the mass portion 70 (a part which comes into contact with the stopper 48 when the white key 2_a_ is pressed) of the hammer 7 in the rotation direction and the stopper 48 gradually narrows from the white key 2_a_ on the low tone side to the white key 2_a_ on the high tone side have been described, but the embodiment is not necessarily limited to these. For example, the spacing between the mass portion 70 of the hammer 7 in the rotation direction and the stopper 48 may be uniform from the white key 2_a_ on the low tone side to the white key 2_a_ on the high tone side.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A keyboard device comprising:
a support member;
keys of which rear portions are swingably supported by the support member; and
guides which guide swinging of the keys on a side behind support positions of the rear portions of the keys,
wherein the guides each comprise a pair of guide surfaces directed in a scale direction,
the keys each comprise a pair of guided surfaces facing the pair of guide surfaces in the scale direction,
the entire guided surfaces face the guide surfaces at an initial position before the key is pressed,
gaps are respectively formed with respect to the guide surfaces on lower end sides of the guided surfaces, and
the gaps gradually widen toward the lower end sides of the guided surfaces.

2. The keyboard device according to claim 1,
wherein the key comprises: a pair of side plates of which outer surfaces directed in the scale direction are formed as the guided surfaces and face each other in the scale direction; and a connection plate which connects upper end sides or lower end sides of the pair of side plates in the scale direction.

3. The keyboard device according to claim 2,
wherein the connection plate connects the lower end sides of the side plates.

4. The keyboard device according to claim 3,
wherein a spacing between inner surfaces of the side plates directed in the scale direction gradually narrows toward the lower end sides of the side plates.

5. The keyboard device according to claim 2,
wherein the key comprises a closing plate closing a space surrounded by the pair of side plates and the connection plate from a rear side.

6. The keyboard device according to claim 1,
wherein the guided surfaces comprise a first guided surface which is a flat surface inclined with respect to the guide surface, and a second guided surface which is connected to a lower end of the first guided surface and has a larger widening degree of the spacing with respect to the guide surface than the first guided surface.

7. A keyboard device comprising:
a support member;
keys of which rear portions are swingably supported by the support member; and
guides which guide swinging of the keys on a side behind support positions of the rear portions of the keys,
wherein the guides each comprise a pair of guide surfaces directed in an arrangement direction of the keys,
the keys each comprise a pair of guided surfaces facing the pair of guide surfaces in the arrangement direction,
gaps are respectively formed with respect to the guide surfaces on lower end sides of the guided surfaces, and
the gaps gradually widen toward the lower end sides of the guided surfaces.

8. The keyboard device according to claim 7,
wherein the key comprises: a pair of side plates of which outer surfaces directed in the arrangement direction are formed as the guided surfaces and face each other in the arrangement direction; and a connection plate which connects upper end sides or lower end sides of the pair of side plates in the arrangement direction.

9. The keyboard device according to claim 8,
wherein the connection plate connects the lower end sides of the side plates.

10. The keyboard device according to claim 9,
wherein a spacing between inner surfaces of the side plates directed in the scale direction gradually narrows toward the lower end sides of the side plates.

11. The keyboard device according to claim 8,
wherein the key comprises a closing plate closing a space surrounded by the pair of side plates and the connection plate from a rear side.

12. The keyboard device according to claim 1,
wherein the guided surfaces comprise a first guided surface which is a flat surface inclined with respect to the guide surface, and a second guided surface which is connected to a lower end of the first guided surface and has a larger widening degree of the spacing with respect to the guide surface than the first guided surface.

13. The keyboard device according to claim 12,
wherein the second guided surface is a curved surface.

14. A method for guiding a key in a keyboard device including a support member, keys of which rear portions are swingably supported by the support member, and guides which guide swinging of the keys on a side behind support positions of the rear portions of the keys, in which
the guides each comprise a pair of guide surfaces directed in a scale direction, and
the keys each comprise a pair of guided surfaces facing the pair of guide surfaces in the scale direction, the method comprising:
causing the entire guided surfaces to face the guide surfaces at an initial position before the key is pressed; respectively forming gaps with respect to the guide surfaces on lower end sides of the guided surfaces; and
forming the gap to gradually widen toward the lower end sides of the guided surfaces.

15. The method according to claim 14,
wherein the key comprises: a pair of side plates of which outer surfaces directed in the scale direction are formed as the guided surfaces and face each other in the scale direction; and a connection plate which connects upper end sides or lower end sides of the pair of side plates in the scale direction.

16. The method according to claim 15,
wherein the connection plate connects the lower end sides of the side plates.

17. The method according to claim 16,
wherein a spacing between inner surfaces of the side plates directed in the scale direction gradually narrows toward the lower end sides of the side plates.

18. The method according to claim 15,
wherein the key comprises a closing plate closing a space surrounded by the pair of side plates and the connection plate from a rear side.

19. The method according to claim 14,
wherein the guided surfaces comprise a first guided surface which is a flat surface inclined with respect to the guide surface, and a second guided surface which is connected to a lower end of the first guided surface and has a larger widening degree of the spacing with respect to the guide surface than the first guided surface.

* * * * *